Sept. 8, 1970  R. E. ANDERSON  3,528,011
LIMITED ENERGY SPEECH TRANSMISSION AND RECEIVING SYSTEM
Filed Dec. 22, 1967  10 Sheets-Sheet 1
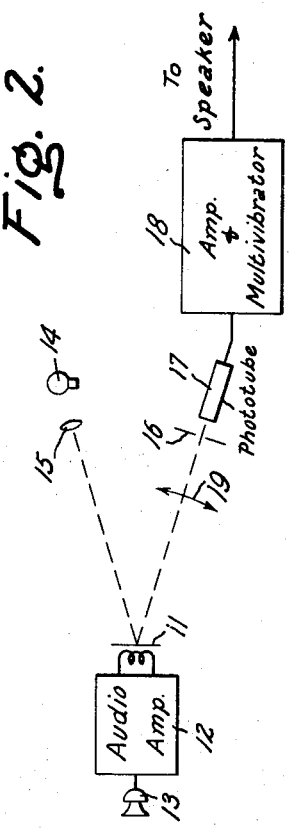
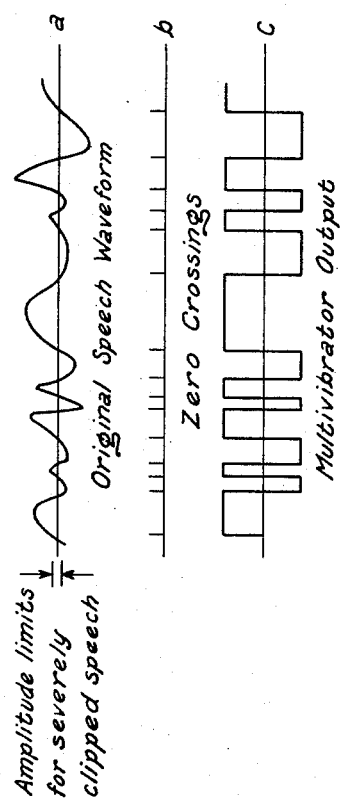
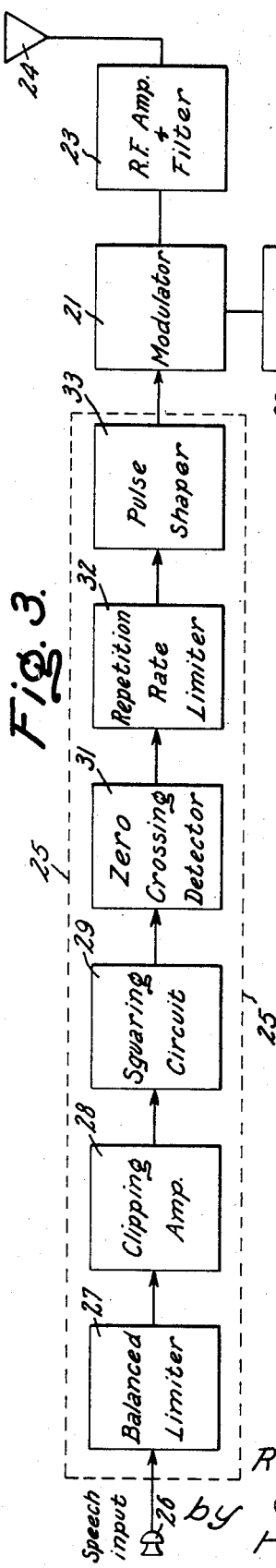
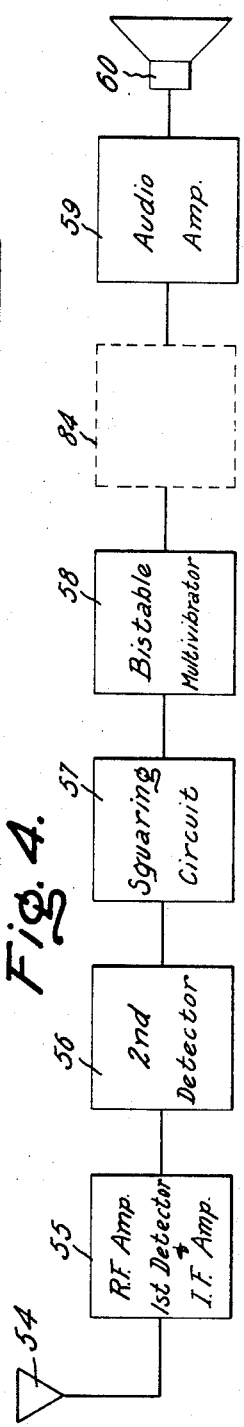
Inventor:
Roy E. Anderson,
by Paul A. Frank
His Attorney.

Fig. 5.
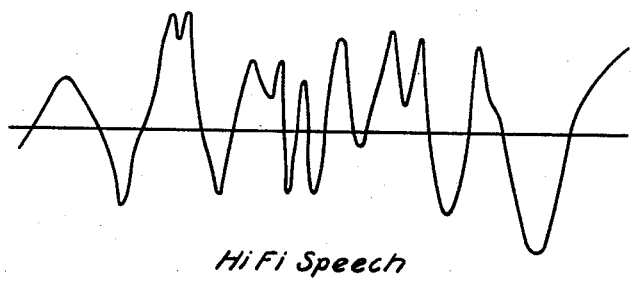
Hi Fi Speech
Clipping Amplifier output
Squaring Circuit Output
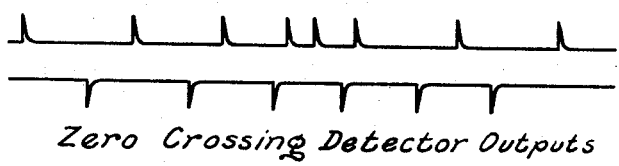
Zero Crossing Detector Outputs
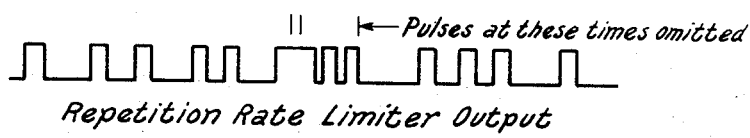
Repetition Rate Limiter Output
Pulse Shaper Output Sept. 8, 1970  R. E. ANDERSON  3,528,011
LIMITED ENERGY SPEECH TRANSMISSION AND RECEIVING SYSTEM
Filed Dec. 22, 1967  10 Sheets-Sheet 3

Inventor:
Roy E. Anderson,
by Paul A. Frank
His Attorney.

Inventor:
Roy E. Anderson,
by Paul A. Frank
His Attorney.

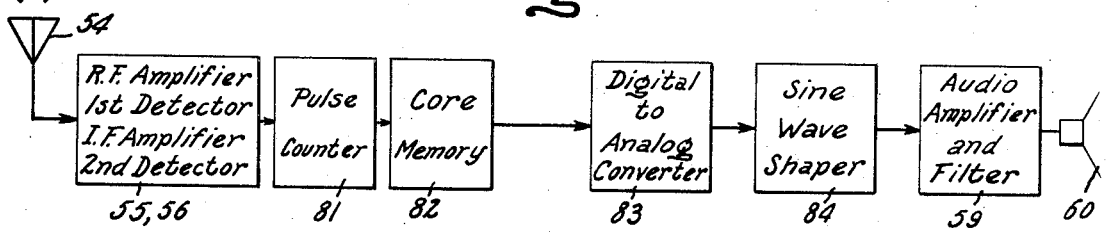
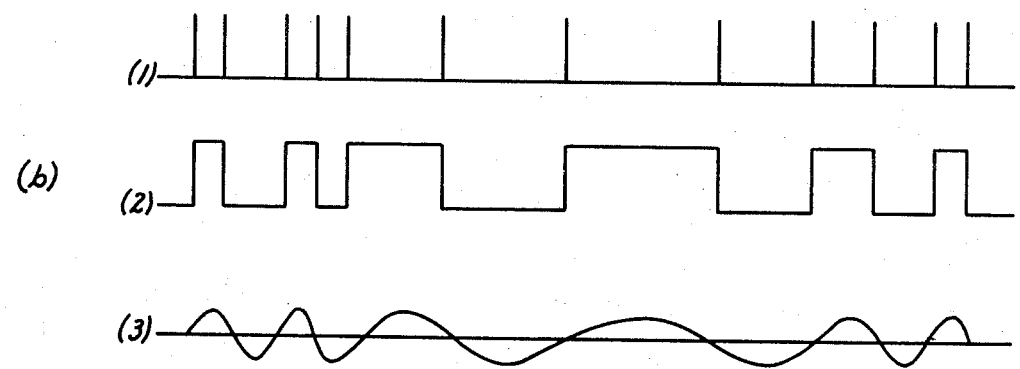
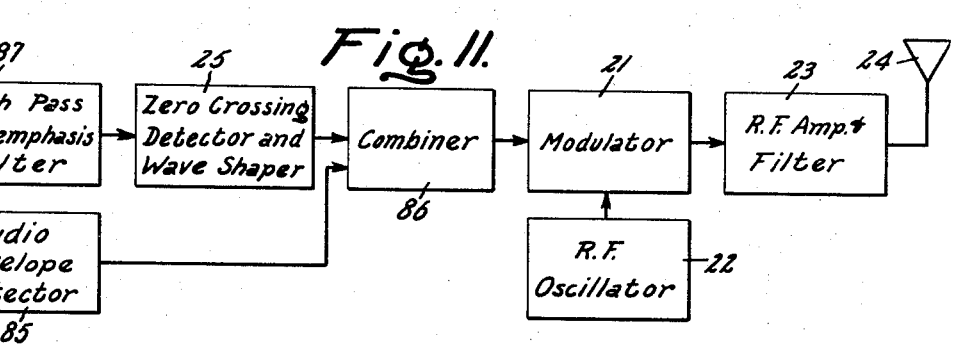
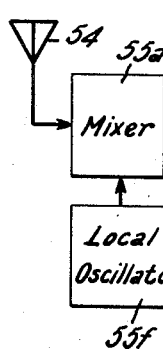

(a) Speech Waveform (b) Transmitted Waveform (c) Received Processed Waveform

Experimental Receiver Modulator Circuit

Experimental Transmitter Audio Envelope Detector

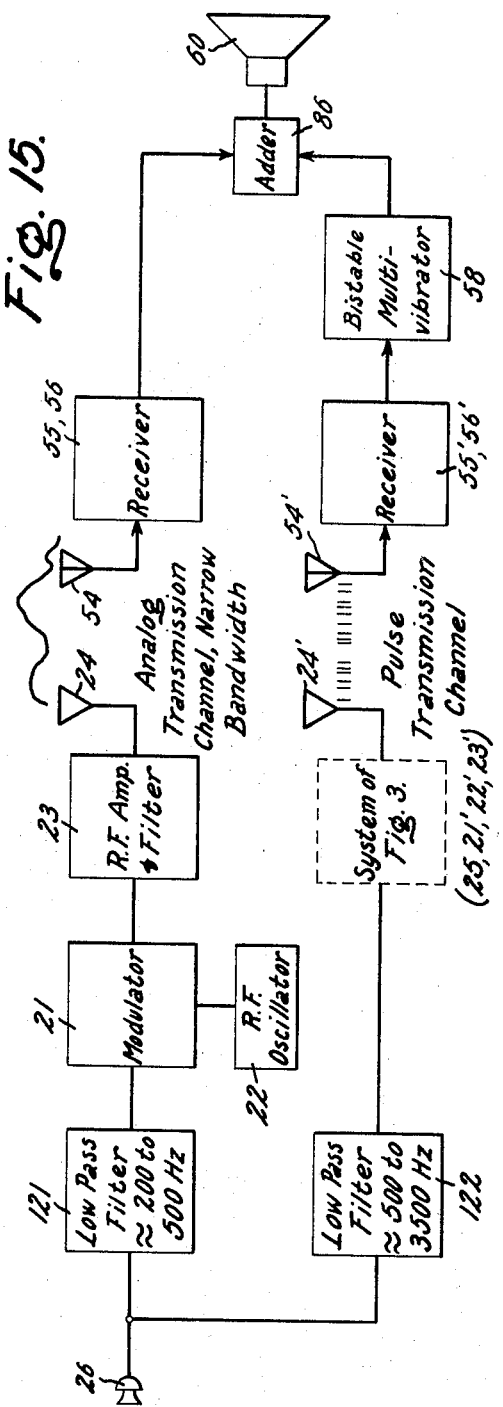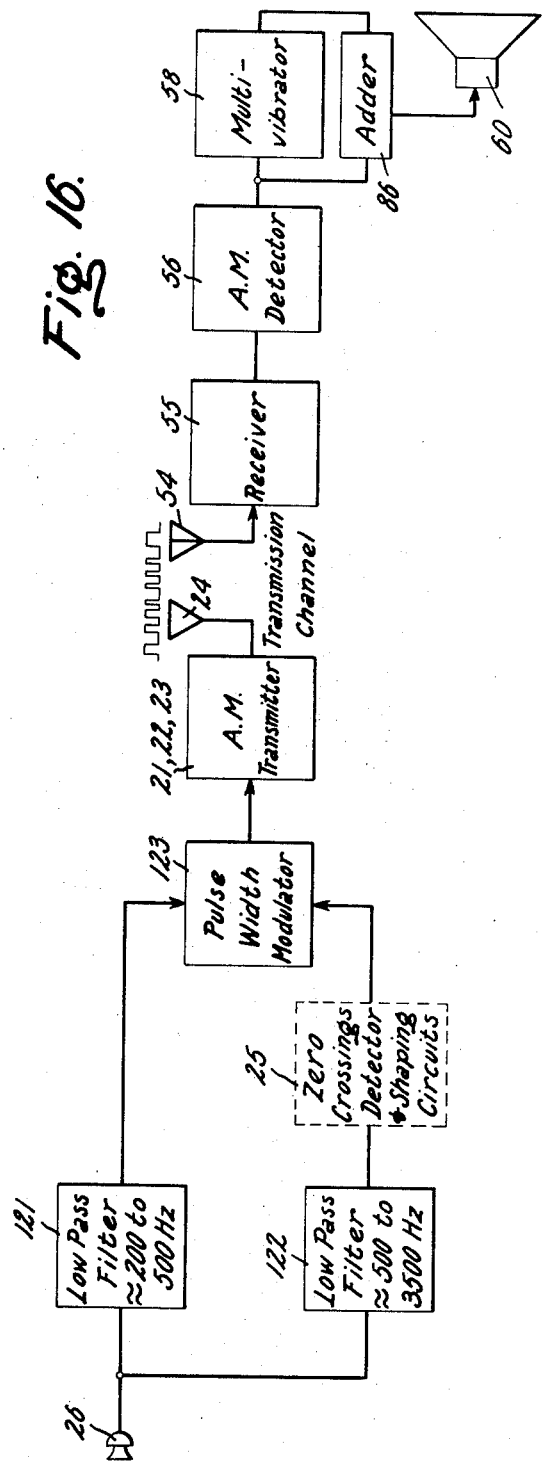

Inventor:
Roy E. Anderson,
by Paul A. Frank
His Attorney.

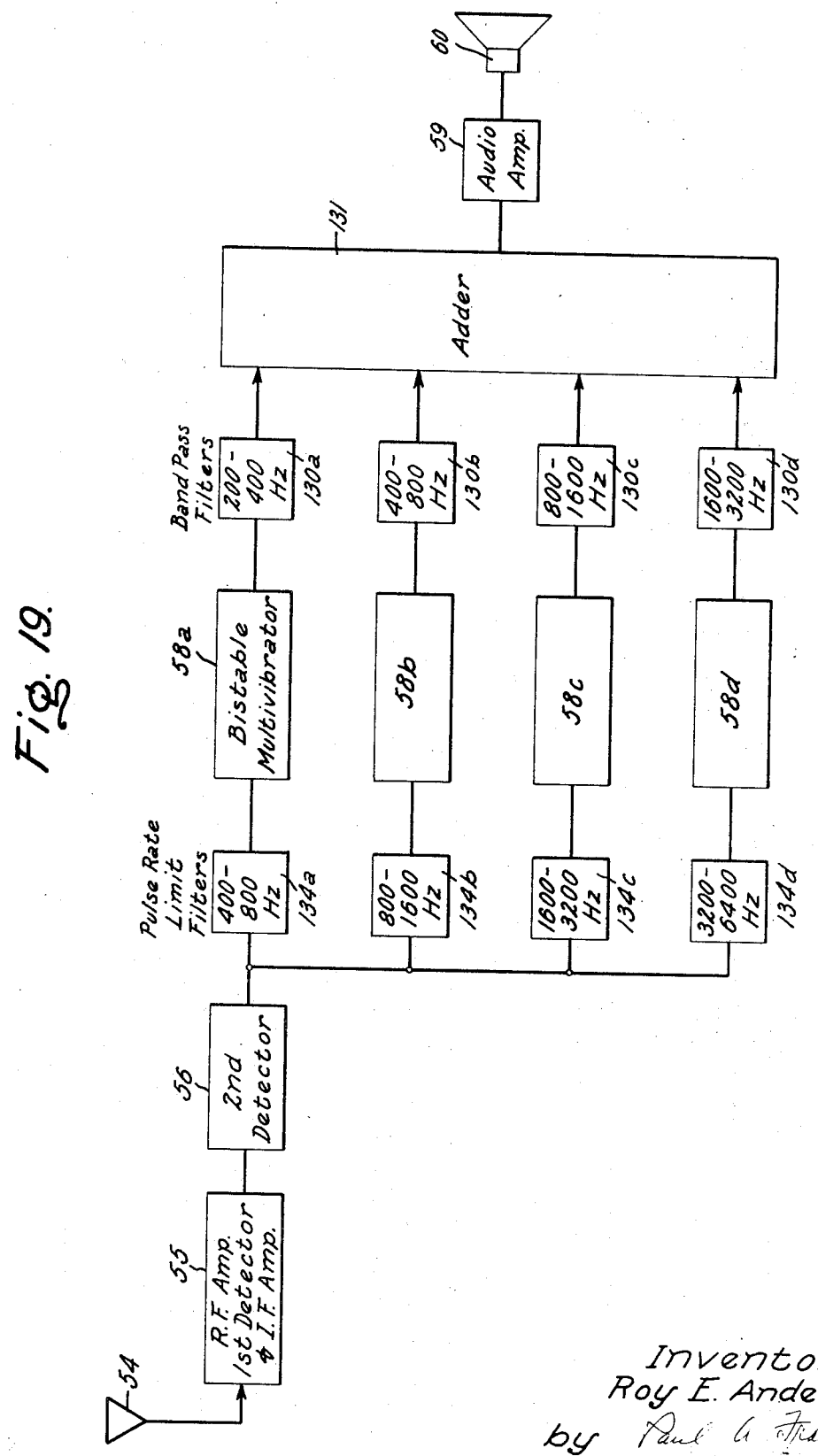

United States Patent Office 3,528,011
Patented Sept. 8, 1970

3,528,011
LIMITED ENERGY SPEECH TRANSMISSION AND RECEIVING SYSTEM
Roy E. Anderson, Schenectady, N.Y., assignor to General Electric Company, a corporation of New York
Continuation-in-part of application Ser. No. 563,219, July 6, 1966. This application Dec. 22, 1967, Ser. No. 700,310
Int. Cl. H04b 1/04
U.S. Cl. 325—38     21 Claims

ABSTRACT OF THE DISCLOSURE

A new limited energy speech transmission and receiving system wherein a speech signal is first digitized and then transmitted by pulse techniques to achieve a substantial reduction in the transmitting energy. Digitizing of the input speech signal is achieved by developing time sequential pulses representative of the zero-crossing positions of the input speech signal. The zero crossing positions are determined by the points where the input speech signal passes through the long time average value thereof, which is defined as the zero value, and hence the points where the speech signal passes through this value are defined as zero-crossing points. These zero-crossing signal pulses are then modulated on a suitable radio frequency carrier for transmission to the receiving apparatus. By this arrangement, transmission occurs only when there is a bit of information to be conveyed. This technique then allows intelligible speech to be transmitted with considerable less energy (about one-tenth) the energy required by conventional energy saving techniques such as single side band suppressed carrier (SSB).

---

This application is a continuation-in-part of my copending application S.N. 563,219, filed July 6, 1966, now abandoned, entitled, "Limited Energy Speech Transmission and Receiving System," and assigned to the assignee of the present invention.

My invention relates to a new and improved speech communication system employing radio frequency waves.

More particularly, my invention relates to a new and improved limited energy speech transmission and receiving system.

It has long been known that all the amplitude modulation can be removed from an audio frequency speech signal by severe clipping or limiting without destroying its intelligibility, although the subjective quality of the speech is degraded. This follows from the fact that the intelligibility is contained in the spectral distribution of the speech energy rather than in the amplitude or phase relationships. See, for example, an article by J. C. R. Licklider and I. Pollack appearing in the "Journal of the Acoustical Society of America," volume 20, No. 1, January, 1948, pages 42–51. A number of experimenters have studied the characteristics of speech using pulses generated at the time of each zero crossing, although most of these efforts have been directed towards speech analysis, often for speech band width compression schemes, etc.

It is therefore a primary object of my invention to provide a new and improved limited energy speech transmission and receiving system which allows for substantial reduction in the energy required to transmit a given amount of information.

Another object of my invention is to provide a limited energy speech transmission and receiving system having the above characteristics which allows simplicity of design in the equipment of both transmitter and receiver, and which can utilize integrated circuit manufacturing techniques and fabrication of the equipment.

A further object of my invention is to provide such a limited energy speech transmission and receiving system which results in greater fidelity of reproduction, less noise, etc., and which is compatible with other known types of digital communications such as pulse position modulation (PPM), or pulse ranging systems for position fixing such as may be used in a navigation satellite system.

A still further object of my invention is to provide a limited energy speech transmission and receiving system of the above type which allows for time multiplexing thereby increasing the number of information channels incorporated in a given communication link and which can be used with various coding methods for antijam and secure communications.

In practicing my invention, a limited energy speech communication system is provided which employs transmitter means and receiver means. My communication system may utilize any means of energy propagation such as optical, radio frequency and wired systems. In the specific case of radio frequency propagation, the transmitter means includes modulator means supplied by a source of radio frequency carrier signals having its output coupled through appropriate filter radio frequency amplifier means to transmitting antenna means. The receiver means includes antenna means and demodulation means for reproducing the input intelligent signal supplied to the modulator means of the transmitter in a system including the above elements. The improvement comprises microphone and amplifying means for reproducing speech waves in electrical form, zero-crossing detector means ouperatively coupled to the output of the microphone and amplifying means for converting the speech signal to a time sequential series of pulsed electric signals representative of the zero-crossing points of the original speech wave form. Suitable wave shaping circuit means are provided which have the input thereof coupled to the output of the zero-crossing detector means, and has its output coupled to the input of the modulator means of the transmitter. The system is further comprised by the improvement of wave shaping circuit means operatively intercoupled intermediate the output of the receiver demodulation means and a means for reproducing the original speech signal in a perceptible form.

Other objects, features and many of the attendant advantages of my invention will be appreciated more readily as the same becomes better understood by reference to the following description, when considered in connection with the accompanying drawings, wherein like parts in each of the several figures are identified by the same reference character, and wherein:

FIG. 1 is a series of voltage versus time characteristic wave shapes illustrative of the zero-crossings speech wave form modulation technique employed in my invention.

FIG. 2 is a functional block diagram of an electrical-mechanical zero-crossing modulator or detector which was used in an early form of limited energy speech transmisison and receiving systems constructed in accordance with my invention;

FIG. 3 is a functional block diagram of an all electronic zero crossing limited energy speech transmitter constructed in accordance with my invention;

FIG. 4 is a functional block diagram of a receiving system suitable for use with the transmitter of FIG. 3.

FIG. 5 is a series of voltage versus time characteristic wave shapes illustrating the manner of operation of the transmitter shown in FIG. 3;

FIG. 10 is a functional block diagram of a limited energy speech receiver constructed in accordance with my invention which employs sinusoidal wave shapes of constant amplitude with varying periodicity to accomplish limited energy speech transmission in accordance with my invention as illustrated by the wave shapes shown in FIG. 10(b);

FIG. 11 is a functional block diagram of a form of limited energy speech transmitter constructed in accordance with my invention wherein audio envelope shaping of the zero-crossing pulses is employed;

FIG. 12 is a functional block diagram of a receiving system for use with the transmitter of FIG. 11;

FIG. 15 is a functional block diagram of a hybrid form of limited energy speech transmission and receiving system in accordance with my invention wherein a low frequency analog signal is transmitted along with the higher frequency zero crossing pulses; the two signals being transmitted on separate carriers;

FIG. 16 is a functional block diagram of a modified form of the hybrid limited energy speech transmission and receiving system shown in FIG. 15, wherein the low frequency audio signal and the higher frequency zero-crossing pulses are transmitted on a common carrier;

FIG. 19 is a functional block diagram of a receiving system for use with the transmitter of FIG. 3.

Figure 6:
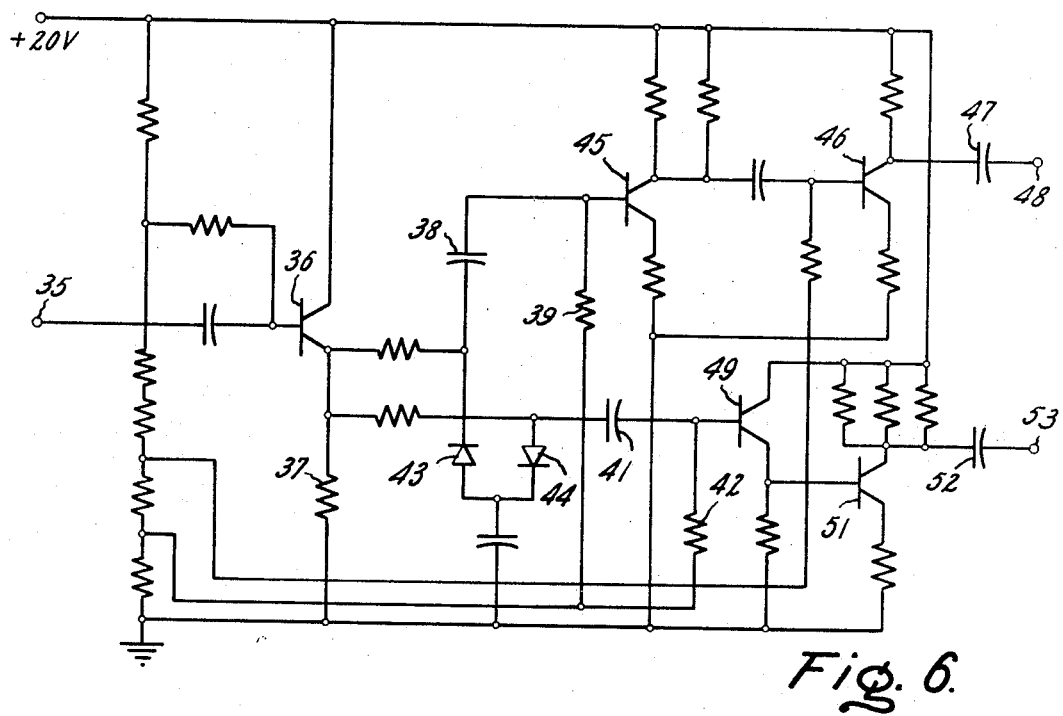
FIG. 6 is a schematic circuit diagram of an electronic zero crossing detector employed in the transmitter shown in FIG. 3.

Zero crossing pulses applied to a bistable multivibrator produce a wave form that is simulation of severely clipped speech. It was postulated by the inventor that if speech could be processed in this manner with intelligible results, the intelligence in speech could be transmitted with relatively low energy by transmitting short pulses, all of the same shape and amplitude, and one for each zero crossing of the audio frequency speech wave form. FIG. 1 of the drawings depicts the wave form relations in this process wherein the original audio frequency speech wave form is shown in FIG. 1a. FIG. 1a also depicts the amplitude clipping level, and further depicts the resulting amplitude wave shapes. This amplitude-clipped wave shape signal is then processed, as will be described more fully hereinafter, to produce zero-crossing pulses, indicated in FIG. 1b, which are representative of the zero-crossing point of the original audio frequency speech signal. The zero-crossing signal pulses are then transmitted to the receiver and are used to trigger a bistable multivibrator located at the receiver to produce the constant amplitude varying period square wave signal illustrated in FIG. 1c of the drawing.

FIG. 2 of the drawings illustrates an early form of electromechanical zero-crossing detector or modulator with which the zero-crossing pulses depicted by FIG. 1b of the drawings could be derived from the clipped speech wave form signal shown in FIG. 1a. All electronic circuits are now available for this purpose, as will be described hereinafter; however, the system shown in FIG. 2 of the drawing is helpful in understanding the manner in which the zero-crossing pulses are derived, and their nature.

With the arrangement shown in FIG. 2, a galvanometer mirror 11 is driven by an audio amplifier 12 to which the speech signals are applied through a microphone 13. Light derived from a source 14 is focused by lens 15 on the galvanometer driven mirror 11 in a manner such that the light reflected by the mirror 11 is directed toward a slit aperture 16. The slit aperture 16 is positioned in front of a phototube 17 having its output supplied through an amplifier and monostable multivibrator circuit 18.

As a result of the above arrangement, the galvanometer driven mirror 11 causes the light beam from source 14 to be scanned back and forth across the slit aperture 16 in the manner depicted by arrow 19 so as to produce a series of pulses which occur substantially at the time of the zero crossings of the audio frequency signal supplied from audio amplifier 12. The pulses derived from phototube 17 are then applied to the multivibrator 18 to derive the speech wave form signal depicted at FIG. 1c. With the arrangement shown in FIG. 1, the ratio of the peak amplitude to the clipping level could be changed simply by changing the amplitude of the signal supplied to the galvanometer driven mirror 11. The effect of clipping at a level different from the axis of the speech wave form can be tested easily by moving the slit aperture 16 to a different part of the scan of the reflected light beam.

A total scan much larger than the light beam diameter or slit width of the aperture 16 was produced by large deviation of the galvanometer driven mirror 11. The results demonstrated that very severe clipping of the speech wave form signal still produced acceptable results. Displacement of the slit 16 from the center of the scan resulted in degradation in quality, with the low amplitude components at the start of words and some unvoiced sounds being lost. However, acceptable results were obtained without critical adjustment of the slot position, indicating that the requirement for selecting the point defined as the zero crossing is not severe.

Recent experiments have been conducted using all electronic circuits such as those shown in FIGS. 3 and 4, etc. Although, as noted above, there is some tolerance in defining zero-crossing values in the wave form, a balanced limited is preferably used which provides an initial processing step in order to select the zero crossing as close to the long time average of the input speech wave form as possible. Input signals consisted of conversational speech as well as single and double syllable words and sentence lists for intelligibility tests. These were tape recorded to provide the same input signals as parameter values or other conditions were changed. Other experiments were made with microphone inputs, radio programs including voice and music, and typical air traffic control messages. Using the tape-recorded input, other tape recordings were made of the output. These have been played for rather large numbers of persons of various backgrounds and interests, and all agree that the results are intelligible. Some who are acquainted with HF (high frequency) voice transmission have remarked that the results sound better than many voice signals received over HF radio, and consider the results to be quite good.

Intelligibility for sentences and multisyllabic words is very good, but it is somewhat lower for monosyllabic words. It seems that a short portion of the beginning of many words is cut off, and this has a distorting effect on the whole word. A further effect on intelligibility is noted when a noise pulse occurs during a word. The occurrence of a noise pulse results in a "click" when it occurs, for it causes a phase reversal in the wave form. The intelligibility is not seriously affected unless such noise pulses occur several times per second.

Noise added to the input signal, for example, acoustic noise at the microphone, has almost no effect on intelligibility if it is below the speech amplitude. It appears in the output as noise completely filling the spaces between words and having full output amplitude. It seems to be absent during the words, and thus while it is annoying it does not degrade intelligibility. However, if the input noise is not suppressed, it will reduce the transmission efficiency of the system because it will add pulses that require transmission energy but do not convey information.

While the technique is not intended for music the result is quite interesting. Some instruments that have high harmonic content sound quite natural, others sound harsh. The overall result, while not particularly pleasing, was better than expected.

In general, the quality for speech is harsh. This is due to the harmonics present on all frequency components by reason of their square wave shape and in particular the harmonics of the lower frequency components which lie within the audio pass band at the receiver output. Audio filters having various characteristics such as an attenuation of six decibels per octave, have been suggested by others, and were tried. While the use of such elements produced a notable improvement in the subjective quality, they were not successful in reducing the harshness to a value that resulted in pleasing quality. However, the techniques illustrated in FIGS. 17a, 17b, 18a, 18b and 19 substantially reduce such harshness. While it is far from complete, the following discussion is intended to convey a notion of the reasons why speech can be described by a pattern of zero crossings.

The intelligibility of speech is contained in the spectral distribution of the energy, not in the amplitude or phase relationships. Voiced speech sounds are generated by the vocal cords as a triangular wave form rich in harmonics. The fundamental component is in the general range of 100 cycles per second. By shaping the cavities of the throat, mouth, and nose, harmonics are emphasized in some parts of the spectrum and suppressed in other parts of the spectrum. Thus, the difference between "ah" and "oh" is in the selection of the regions of frequency in which the harmonics are emphasized. Unvoiced sounds are generated by producing a noise wave form and selecting the spectral regions for emphasis. The sound of the letter "s" is a noise in which the higher frequencies of the audio range are emphasized, while "sh" is a noise having a broad spectrum extending into the middle of the audio range. There are combinations of voiced and unvoiced sounds as well, for example, "th" and "zh." The pattern of starts and stops in speech is also important, as in "t" and "k."

In all cases, such as those described above, the preservation of the spectral distribution and the timing of starts and stops in the zero crossing pattern is sufficient to preserve the intelligibility. The zero-crossing method of limited energy speech transmission and reception described herein preserves this information.

The maximum rate of zero crossing pulses is twice the highest frequency appearing in the audio speech signal. For transmission, each pulse may have a duration such that the maximum duty cycle is 50%. For example, if the input speech bandwidth is limited to 4,000 cycles per second, there would be a maximum of 8,000 zero crossing pulses per second, each pulse having a duration of $\frac{1}{16,000}$ second. For efficient transmission, the pulses should be shaped for optimum bandwidth, and hence the radio frequency bandwidth would be 16 kilocycles for an audio bandwidth of 4 kilocycles. The 50% duty cycle is suggested because if it is longer, a wider bandwidth might be needed to resolve the space between pulses at the maximum rate.

The following comparison of limited energy speech transmission in accordance with the present invention to speech transmission using single side band suppressed carriers (SSB) is included in order to convey some notion of the nature of the energy-saving made possible by the invention.

As noted above, the radio frequency (RF) bandwidth for limited energy speech transmission (hereinafter referred to as LEST) is four times that of the audio bandwidth. It is obvious therefor that the energy saving is not by reduction of bandwidth as is the case with single side band suppressed carrier or vocoders. The savings with the LEST technique results from the fact that the average frequency in voice is far below the maximum frequency. The average rate of zero pulses is determined by counting the number of zero crossings in a sample of conversational speech and taking the average. For 6,000 cycles per second audio bandwidth, the average rate was very near one tenth the maximum, or approximately 1200 pulses per second. Several additional tests were made on speech samples having various audio bandwidths and the approximate one to ten ratio of average to peak pulse rates was found to hold. The highest rate of zero crossings occurs during unvoiced consonances such as "s" and "sh" which occupy only a small percentage of the total time during speech. Most voiced sounds have average rates far below the maximum, and a relatively large portion of the time of conversational speech is occupied by gaps and pauses.

The energy saving comes about through the efficient transmission of energy only when a bit of information is required. LEST is a form of information source encoding in which unnecessary redundancy (amplitude) is removed from the initial message, and channel encoding (digital) is used for transmission with reduced signal-to-noise (S/N) ratio. The following table compares LEST with single side band suppressed carrier in which there is neither message source encoding or channel encoding.

A COMPARISON OF LOW ENERGY SPEECH TRANSMISSION WITH SINGLE SIDEBAND SUPPRESSED CARRIER

|  | LEST, db | Power Advantage of LEST, db | SSB, db |
|---|---|---|---|
| Audio Bandwidth | (1) |  | (1) |
| Output S/N |  | 30 |  |
| RF Bandwidth | (2) | −6 | (1) |
| RF S/N, peak to RMS Noise |  | 15 | 30 |
| Average Pulse Rate | (3) |  |  |
| Average to Peak Ratio |  |  | −12 |
| Duty Cycle | (4) |  | (5) |
| Average S/N | +2 | +16 / +10 | 18 |

1 6,000 c.p.s.
2 24,000 c.p.s.
3 1,200.
4 .05 (−13 db).
5 1:0.

The following table makes a similar comparison of the

LEST system to a frequency modulation system with feedback (FMFB):

TYPICAL OPERATION

|  | FMFB | LEST |
|---|---|---|
| Audio Output S/N, db | 30 | 30 |
| Deviation Ratio | 5 | |
| $f_{rf}/f_b$ | 12 | 4 |
| Carrier Power / Noise Power in 2 $f_b$ | (1) | |
| Carrier Power / Noise Power in $f_{rf}$ | 2.7 | |
| Peak Pulse / RMS Noise in $f_{rf}$ | | 20 |
| Duty Cycle (Maximum) | 1 | .5 |
| S/Nx $f_{rf}$ ×Duty Cycle (Maximum) | 33 | 40 |
| Average Audio Frequency / Maximum Audio Frequency | .3 | .3 |
| Speech-Pause-Ratio / Full Time | .5 | .5 |
| Actual Duty Cycle | 1 | .075 |
| S/Nx $f_{rf}$ ×Duty Cycle (Actual) | 33 | 6 |
| Energy Advantage for LEST vs. FMFB | | 5.5 |

[1] 16 (12 db).

NOTE.—$f_b$ = Audio bandwidth; $f_{rf}$ = Radio frequency bandwidth.

A valid comparison with the techniques mentioned above, as well as others, must also include a comparison of the complexity, size, weight, and reliability of the equipment necessary for its implementation. The LEST system herein proposed can be implemented with simple equipment, most of which can be fabricated using integrated circuit techniques as will become more apparent in connection with the detailed description of the several LEST systems described hereinafter in connection with FIGS. 3 through 19.

The LEST system shown in FIGS. 3 and 4 of the drawing is comprised of a transmitter illustrated in FIG. 3. The transmitter shown in FIG. 3 of the drawings is comprised by a conventional radio frequency modulator 21 having one input supplied from a source of radio frequency carrier oscillations 22. The output from the modulator 21 is supplied through a conventional radio frequency amplifier and filter circuit 23 to a transmitting antenna 24. These are all conventional elements, descriptions of which can be found in any of the known text such as Terman's "Radio Engineer's Handbook"; "Selected Semiconductor Circuits Handbook"—edited by Seymour Schwartz—John Wiley & Sons, Publishers; and "Transistor Electronics"—Lo, Endres et al.—published by Prentice-Hall. The remaining input terminal of the modulator 21 is supplied from a zero-crossing detector and wave shaping circuit means 25 which in turn has its input supplied from a conventional microphone 26 and associated amplifier (not shown) should such be required.

The zero-crossing detector and wave shaping circuit means 25 is comprised by a balanced limiter 27 having its input connected to the output of the microphone 26. The balanced limiter may comprise any conventional transistor balanced audio amplifier having its collector voltage adjusted to a sufficiently low value such that a limiting function is achieved. The output of the balanced limiter 27 is then supplied to the input of a conventional transistor clipping amplifier 28 which serves to clip the amplitude level of the signal supplied thereto to a constant low value in the manner shown in FIG. 1a of the drawings. If desired, the functions of the balanced limiter and clipping amplifier can be incorporated into a single circuit; however, for convenience, it has been illustrated as comprising two separate circuits. The output signal derived in the clipping amplifier 28 is supplied to the input of a squaring circuit 29 which may comprise a modified Schmitt-trigger circuit for converting the clipped wave form signal shown in FIG. 1a of the drawing having sloping leading and trailing edges, to a substantially constant amplitude, varying periodicity, square wave form signal having rectilinear leading and trailing edges, such as is illustrated in FIG. 1c of the drawing. This square wave shape signal is then supplied to the input of a zero-crossing detector circuit 31, the construction of which will be described in greater detail in connection with FIG. 6 of the drawings.

The zero crossing detector circuit 31 serves to develop zero crossing pulses illustrated in FIG. 1b of the drawing. There is one zero crossing pulse generated for each zero crossing of the original speech wave form. These zero crossing pulses are then supplied through a repetition rate limiter circuit 32 to the input of a second pulse-shaping circuit 33. The repetition rate limiter circuit may or may not be used as a matter of design choice, but, if incorporated, it performs the function of integrating together the zero crossing pulses which are too closely spaced together to be properly distinguished in the output signal. For this purpose, a pair of interconnected conventional monostable multivibrator circuits may be employed which will remain in their unstable state of operation for as long as closely spaced zero crossing pulses are applied to the input thereof. The repetition rate limiter signal pulses appearing at the output of circuit 32 are then applied to the pulse-shaping circuit 33 comprising a second monostable multivibrator for producing output signals of pulsed wave shape, fixed amplitude and time duration and varying periodicity that is applied to the input of the modulator 21. This pulsed wave shape, varying periodicity signal is then modulated on the radio frequency carrier signal supplied from oscillator 22 and the resulting pulsed radio frequency signal is supplied through RF amplifier and filter 23 to antenna 24 where it is transmitted in accordance with established pulse transmission techniques. If desired, the repetition rate limiter circuit 32 may be omitted, in which event the output of zero-crossing detector 31 is supplied directly to pulse-shaping circuit 33.

The wave form of the signal as it progresses through circuit shown in FIG. 3 is illustrated in FIG. 5 of the drawing. In FIG. 5–1 the wave form of the audio frequency signal supplied to the input of balanced limiter and clipping amplifier 27 and 28, is illustrated. FIG. 5–2 shows the wave form of the output signal obtained from the output of the clipping amplifier 28. It is noted that this signal has sloping leading and following edges which are squared to rectilinear form by the squaring circuit 29 whose output wave form is shown in FIG. 5–3 of the drawing. The square wave signal shown in FIG. 5–3 will have a fixed amplitude and varying period, and is supplied to zero-crossing detector 31. As will be explained more fully hereinafter in connection with FIG. 6, the zero-crossing detector comprises essentially a differentiating circuit which produces the pulsed wave form signal shown in FIG. 5–4 of the drawings from the leading and trailing edges of the square wave signal shown in FIG. 5–3. These differentiated signal pulses are then applied to the input of the repetition rate limiter circuit 32 which then functions to eliminate certain ones of the zero crossing pulses that are too closely spaced, and produces an output signal of constant amplitude square-wave shape and varying periodicity shown in FIG. 5–5. This signal is then applied to the input of the pulse shaping circuit 33 comprised by a monostable multivibrator and results in the pulsed waveform output signal shown in FIG. 5–6 of the drawings. From an examination of FIG. 5–6, it can be appreciated that the pulse-shaping monostable multivibrator 33 produces a single output pulse of fixed time duration and wave shape at the leading edge of each of the signal pulses occurring in the signal waveform shown in FIG. 5–5. These constant amplitude, fixed duration signal pulses are then representative of the zero crossing positions or points of the audio frequency signal supplied to the input of the circuit. It is these zero crossing pulses which are then modulated upon the radio frequency carrier signal and transmitted to the receiving station.

FIG. 6 of the drawings illustrates the details of construction of the zero crossing detector 31. The zero crossing detector 31 in fact comprises nothing more than two differentiating circuits, one for producing a pulse at the leading edge of the square wave-shaped, varying periodicity signal supplied thereto from the squaring circuit 29, and a second pulse at the trailing edge of the said signal from squaring circuit 29. The leading edge signal pulse is depicted by the positive going pip and the trailing edge pulse is depicted by the negative going pip depicted in FIG. 5–4. In order to produce these positive and negative going differentiated signal pulses, the square wave signal appearing at the output of squaring circuit 29 is applied to input terminal 35. This square wave-shaped signal is amplified by an emitter-follower amplifier comprised by a transistor 36 having its load resistor 37 connected in common to the inputs of first and second differentiating circuits. The first differentiating circuit is comprised by a capacitor 38 and a resistor 39, and the second differentiating circuit is comprised by a capacitor 41 and a resistor 42. Energization of the first or second differentiating circuits is controlled by a pair of diodes 43 and 44, respectively, connected in common with the output of emitter-follower amplifier 36 and the first and second differentiating circuits.

Activation of the first differentiating circuit 38 and 39 will allow a positive going signal pulse to be supplied to a two-stage resistance-capacitance coupled amplifier comprised by the two NPN transistors 45 and 46. The amplified signal pulse appearing at the output of two-stage amplifier 45 and 46 is then supplied through a coupling capacitor 47 to an output terminal 48 where it is applied to a first trigger input terminal of the bistable multivibrator which comprises the repetition rate limiter 32 shown in FIG. 3. Similarly, activation of the second differentiating circuit 41, 42 produces a negative going trigger pulse that is amplified in a two-stage resistance-capacitance coupled amplifier comprised by the NPN transistors 49 and 51. The two-stage amplifier 49 and 51 produces a positive going trigger pulse at its output which is supplied through a coupling capacitor 52 to output terminal 53 where it is applied to a second trigger input terminal of the bistable multivibrator comprising repetition rate limiter 32.

In operation, the constant amplitude, varying periodicity square wave signals appearing at the output of the squaring circuit 29 in FIG. 3 are applied to input terminal 35. Upon the occurrence of a positive-going leading edge of this square wave signal, the transistor 36 will be driven into conduction so that a positive voltage appears across the load resistor 37. The occurrence of this positive voltage on load resistor 37 causes the diode 43 to be blocked, and the diode 44 to be rendered conductive. Conduction through diode 44 serves to clamp the input to the second differentiating circuit so that, in effect, it is inactivated. Concurrently, the first differentiating circuit 38 and 39 is activated so as to produce at its output terminal 48 a positive-going trigger pulse that is applied to the input of the repetition rate limiter 32 shown in FIG. 3. Upon the occurrence of the negative-going trailing edge of the square wave signal supplied through input terminal 35, the transistor 36 is returned to its blocking condition. Upon this occurence, the potential across load resistor 37 goes negative so that diode 44 is rendered blocking and diode 43 is allowed to conduct. Conduction through diode 43 results in clamping the input of the first differentiating circuit so that it is rendered inactive. Blocking of the diode 44 allows the second differentiating circuit to be activated, so that it results in producing at the output terminal 53 a positive-going trigger signal pulse as has been previously described which is applied to the second trigger input terminal of the bistable multivibrator comprising the repetition rate limiter 32.

From a consideration of the above description of the operation of the zero-crossing detection circuit shown in FIG. 6, it will be appreciated that the leading edge of the square wave shape signal applied to the input of this circuit in fact corresponds to the point where the original audio-frequency input signal swings through the zero or median level from the negative side of this level to the positive side. Conversely, the trailing edge of the square wave shape signal supplied to input terminal 35 corresponds to the zero crossing point where the original audio-frequency signal passes through the zero or median signal level going from the positive side of the level to the negative side. Accordingly, it can be appreciated that the zero crossing detector circuit shown in FIG. 6 will produce a positive-going limited amplitude trigger pulse of limited time duration at the occurrence of each zero crossing position (or point) of the original audio-frequency input signal. These zero crossing signal pulses are then processed further by the repetition rate limiting circuit 32 and pulse shaping circuit 33 and applied to modulator 21 as was described in relation to the circuit in FIG. 3 of the drawings.

FIG. 4 of the drawings illustrates a suitable receiving system for use with the transmitter of FIG. 3 of the drawings. In the receiving system of FIG. 4, the radio frequency signal received by antenna 54 is applied through an RF amplifier, first detector and IF amplifier 55 to a second detector 56 all of conventional construction. The second detector 56 serves to develop at its output a series of zero crossing signal pulses representative of the zero crossing points of the original audio-frequency input signal. These zero-crossing signal pulses are supplied through a suitable squaring circuit 57 which functions merely to square the leading and trailing edges of the signal pulses supplied thereto from second detector 56. These squared, zero-crossing signal pulses are then applied to the bistable multivibrator 58 which operates to reconvert the zero-crossing pulses to an essentially square waveshape signal of fixed or constant amplitude but of varying periodicity such as is illustrated in FIG. 1c of the drawings. This square wave signal is then supplied through an audio-amplifier 59 (which optionally may be deleted) to a suitable audio speaker 60 or some other suitable means for reproducing the original audio-frequency speech signal in a perceptible form.

Figure 7:
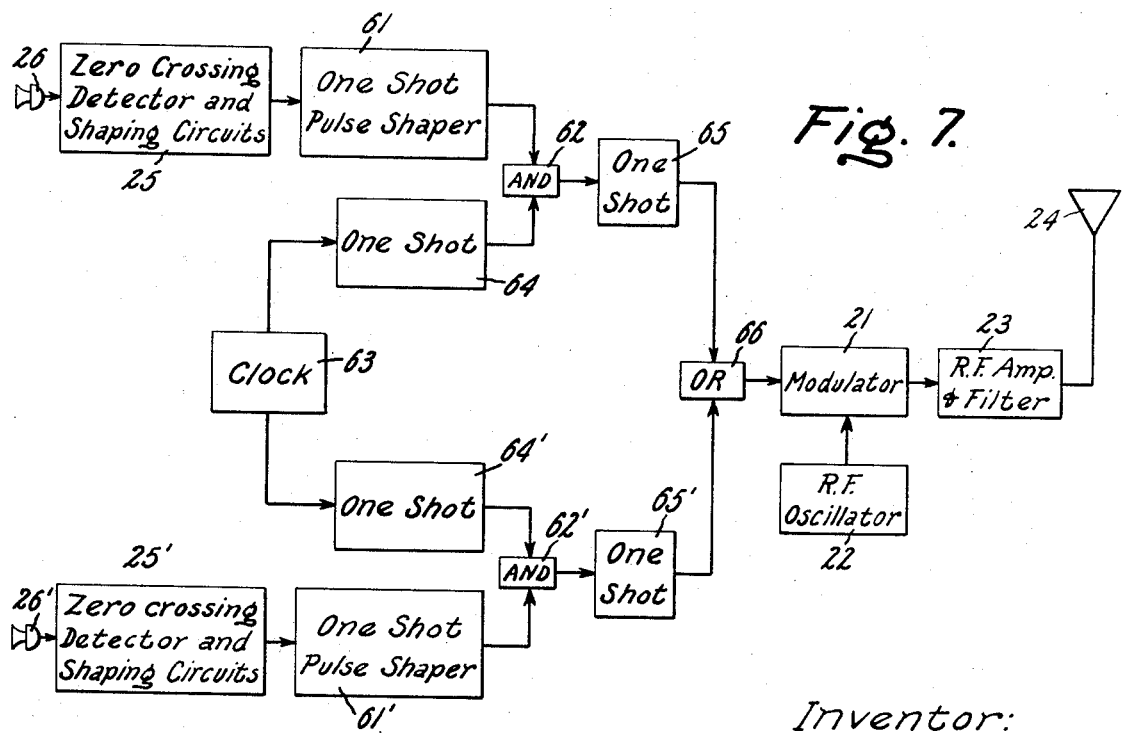
FIG. 7 is a functional block diagram of a multiplex limited energy speech transmitter constructed in accordance with my invention.
Figure 8:
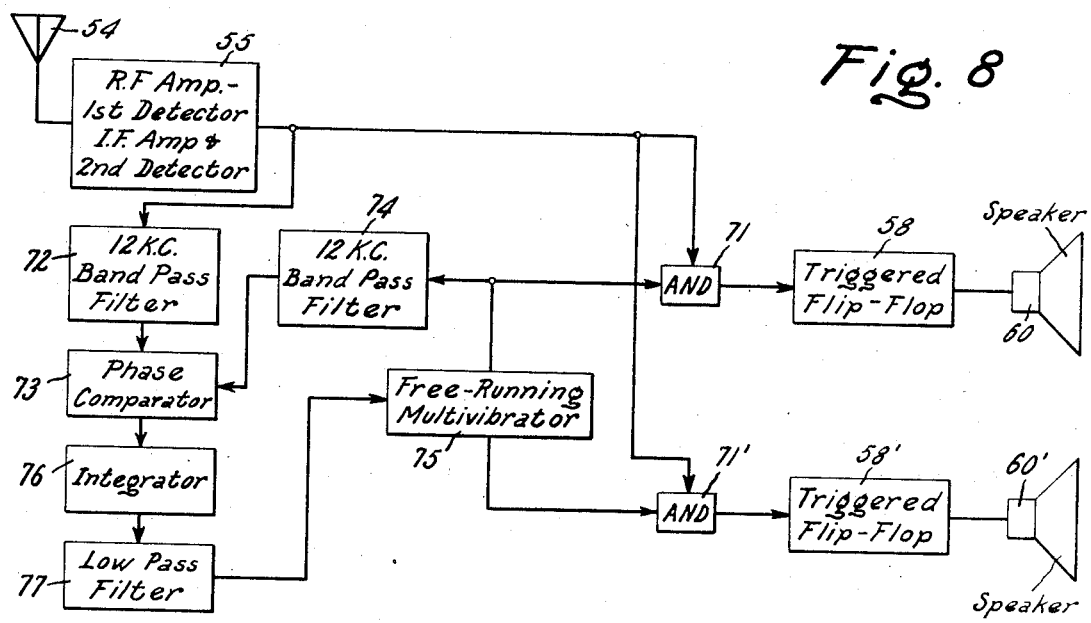
FIG. 8 is a functional block diagram of a demultiplexing receiving system suitable for use with the multiplex transmitter of FIG. 7.

FIGS. 7 and 8 of the drawings illustrate one form of a multiplex limited energy speech transmission system constructed in accordance with my invention. The technique employed in the multiplex system of FIGS. 7 and 8 can also be used with a single voice channel system wherein the zero-crossing pulses are caused to be phase coherent with a digital clock in a manner to be hereinafter described with reference to the multiplex system. The transmitter of this system is shown in FIG. 7 and includes two separate speech channels which are multiplexed together and modulated on a single radio frequency carrier for transmission to the receiving system. In this arrangement, separate speech signals are supplied through the microphone and associated amplifier means 26 and 26′ to zero crossing detector and shaping circuits 25 and 25′, respectively. The zero-crossing detector and shaping circuits may be identical in form to the circuits shown in FIG. 3 of the drawing and therefore would include all of the elements 27 through 33 described with relation to FIG. 3. The output of each of the zero-crossing detector shaping circuits is supplied to the input of a one-shot multivibrator 61 and 61′, respectively, for producing output signal pulses whose time duration can be varied by appropriate adjustment of the one-shot pulse-shaping circuits 61 and 61′. The output of the one-shot pulse-shaping circuits 61 and 61′ are then supplied to one of the input terminals of an associated AND circuit means 62 or 62′. Each of the AND circuit means 62 and 62′ have the remaining input terminals thereof connected to the output from a source 63 of clock signal pulses through respective associated one-shot multivibrators 64 and 64′, respectively. The output from the AND circuit means 62 and 62′ then supply the respective outputs from one-shot multivibrators 65 and 65′ to the input of an OR circuit means 66. OR circuit means 66 has its output supplied to the input of the modulator 21 along with the radio frequency carrier supplied from oscillator 22 for transmission by antenna 24 to the receiving system.

In operation, the speech frequency signals supplied to microphones 26 and 26' are converted to zero-crossing signal pulses by the zero-crossing detector and shaping circuits 25 and 25', respectively. The zero-crossing signal pulses are then used to trigger the monostable multivibrators 61 and 61' whose output pulse widths can be varied in order to adjust the circuit to an optimum operating condition. The zero-crossing signal pulses thus modified are then supplied to the AND circuits 62 and 62' along with the clock signal pulses generated by clock signal pulse generator 63. The two outputs from the clock signal generator 63 are 180° out of phase and arranged so that the negative-going edge of each clock signal is used to trigger its associated one-shot multivibrator 64 or 64'. As a result of this arrangement, two sets of clock pulses which are 180° out of phase and have a variable repetition rate determined by the clock pulse signal generator 63 as well as a variable pulse width, are supplied to AND gates 62 and 62'.

The width of the zero-crossing pulses and the width of the clock signal pulses are adjusted so that at the maximum rate of input zero-crossing (approximately $12 \times 10^3$ per second) the width of the clock pulse is equal to the interval between the zero-crossing pulses as illustrated in FIGS. 9a and 9b of the drawings. FIG. 9a1 illustrates the nature of the channel 1 signal clock pulses applied to AND circuit means 62, for example, and FIG. 9b1 illustrates the nature of the clock signal pulses applied to the AND circuit means 62'. From a comparison of these two wave forms, it will be determined that they are 180° out of phase. FIGS. 9a2 and 9b2 illustrate the wave form ot the zero-crossing signal pulses applied to the AND gate 62 and 62', respectively. The resulting time quantized output signal pulses appearing at the outputs of the AND circuits 62 and 62' are illustrated in FIGS. 9a3 and 9b3, respectively. These output quantized zero-crossing signal pulses are supplied through the one-shot multivibrators 65 and 65', respectively, for wave shaping purposes, and are then applied to OR circuit means 66. The desired multiplex zero-crossing pulses then appear at the output of the OR circuits 66 and are applied to modulator 21 where they are modulated on the radio frequency carrier for transmission to the receiving system.

Figure 9:
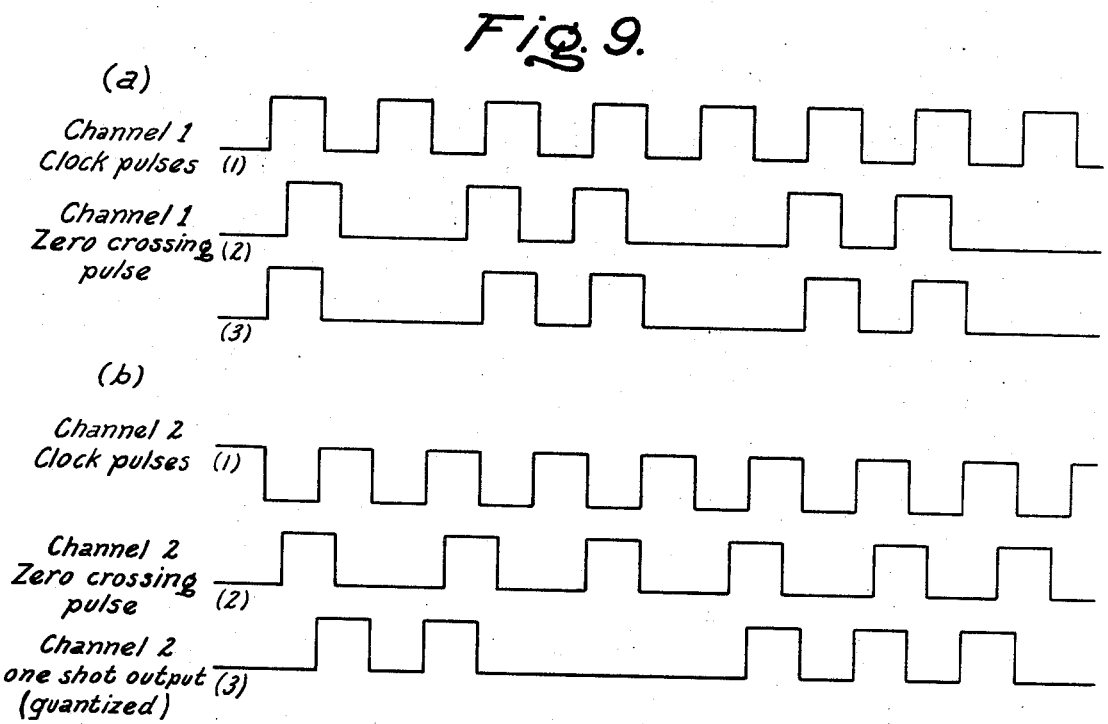
FIG. 9 is a series of voltage versus time characteristic wave shapes illustrating the quantizing and multiplexing time relationships of the signal channels employed in the multiplex transmitter of FIG. 7.

With the width of the clock pulses and the zero-crossing signal pulses adjusted in the manner stated above, the output of the AND circuit means will be one output pulse occurring in coincidence with the clock pulse for each input zero-crossing pulse. Therefore, the rate of the output pulses is the same as the rate of the zero-crossing pulses, and is generally not the same as the rate of the clock pulses, each output (transmitted) pulse being phase coherent with a clock pulse as indicated in FIG. 9. It is possible to lose a zero-crossing pulse if the input pulse begins at the instant that the clock pulse terminates for in this eventuality the zero-crossing pulse then occurs during the time that there is no clock pulse available. As a consequence, the output of the AND gate is zero. However, if the width of either pulse is increased, there exists the possibility that for a single input zero-crossing pulse, the AND gate will have an output of two pulses. These difficulties can be minimized by producing pulses with fast rise and fall times (less than one microsecond). With a rate of 2,000 zero-crossing pulses per second then, typically one channel might lose as many as sixteen zero-crossing pulses per second, while the second channel might gain twelve zero-crossing pulses per second. This would represent an error of less than 1% which is within the tolerance of most communication system requirements.

FIG. 8 of the drawings illustrates a receiving system for use with the transmitter of FIG. 7. In FIG. 8 the incoming signals received by antenna 54 are first demodulated by the RF amplifier, first detector, IF amplifier and second detector strip indicated at 55, 56 so that at the output of circuit 56, the multiplex zero-crossing signal pulse will be produced. These multiplex zero-crossing signal pulses are then supplied to one input of a pair of AND circuit means 71 and 71' for demultiplexing. In addition, the multiplex zero-crossing signal pulses appearing at the output of the circuit 55 are supplied through a band-pass filter means 72 having a 12-kilocycle bandwidth to a phase comparator 73. Phase comparator 73 also has supplied to it a 12-kilocycle signal from a second 12-kilocycle band-pass filter 74 coupled to the output from a receiver source of clock signal pulses comprised by a free-running multivibrator 75. The phase comparator 73 functions to compare the phase of the incoming multiplex zero-crossing signal pulses to the square wave form clock pulses supplied by multivibrator 75 through the filter 74, and any deviation therebetween results in the production of an error signal. This error signal is supplied through an integrating circuit 76 and low-pass filter 77 back to the input of the free-running multivibrator 75 for synchronizing the operation of this multivibrator with the incoming multiplex zero-crossing signal pulses.

The synchronized clock signal pulses produced at the output of multivibrator 75 are also supplied to the inputs of the AND circuits 71 and 71', respectively, with the clock signal pulses supplied to AND circuit 71' being shifted in phase 180° with respect to the clock signal pulses applied to the AND circuit 71. As a consequence of this arrangement, the AND circuit 71 will produce at its output only those zero-crossing signal pulses originally produced by the number one speech channel of the transmitter system shown in FIG. 7, which was comprised by those reference numerals which were not primed. Conversely, the AND circuit 71' will produce at its output those zero-crossing signal pulses produced originally by speech channel number two, thereby resulting in demultiplexing the received zero-crossing signal pulses. The demultiplexed zero-crossing signal pulses are then supplied through triggered flip-flop circuits 58 and 58', respectively, to appropriate speakers 60 and 60', respectively, or to some other suitable means for reproducing the original speech signal in perceptible form. While in the present description a multiplex communication system providing only two channels for information has been disclosed, it is believed obvious that as many additional channels as desired can be added. This can be achieved by shortening the duration of the zero-crossing pulses sufficiently, by the use of suitable phase shifting arrangements and by introducing more sets of interleaved time periods.

FIGS. 10a and 4 of the drawings illustrate a modified form of an LEST receiving system wherein the received pulsed signal is converted to a sinusoidal wave shape signal of fixed amplitude and varying periodicity to thereby produce a more faithful replica of the original speech wave form. For this purpose a transmitter similar to that shown, and described with relation to FIG. 3 of the drawings is employed. Thus, the transmitted signal will be the same as that employed with the system shown in FIGS. 3 and 4. The receiver, however, has to be modified by the inclusion of a sinusoidal wave shaping circuit as shown in phantom at 84 in FIG. 4. The received signal picked up by receiving antenna 54 is demodulated and amplified by the RF amplifier, first detector, IF amplifier and second detector stages shown at 55, 56. Zero-crossing pulses having the wave shape shown at FIG. 10b–1 are produced at the output of the second detector 56 in the form of a series of constant amplitude, fixed duration, varying periodicity zero-crossing signal pulses which are representative of the zero-crossing position of the input speech wave form. These zero-crossing signal pulses having the form shown in FIG. 10b–1 may then be supplied through squaring circuit 57 to the input of bistable multivibrator 58 (as shown in FIG. 4) or other suitable digital-to-analog conversion apparatus where they are converted to an essentially square wave shape signal of fixed amplitude but varying periodicity as shown in FIG. 10b–2 of the drawings. This square wave signal is then supplied to a sine wave-shaping circuit 84 which may comprise one or more tuned resonant circuits or other similar means for converting the square wave signal shown in FIG. 10*b*–2 to a sinusoidal waveshape such as that shown in FIG. 10*b*–3. The sinusoidal waveshape signal again has a constant amplitude but has a varying periodicity which corresponds to the period of the square waveshaped signal supplied thereto from bistable multivibrator 58. This sinusoidal waveshape signal is then supplied through a suitable audio amplifier and filter circuit 59 to a loudspeaker 60.

FIG. 10*a* of the drawings illustrates another form of receiver for use with the sinusoidal waveshaping technique. In the receiver of FIG. 10*a* the zero-crossing pulses appearing at the output of the second detector 56 are supplied to the input of a pulse interval counter 81. Since there are normally two zero-crossing pulses for each speech cycle, this is a divide-by-two counter whose output is supplied to a core memory or register 82. The register 82 has its output supplied through the hereinabove mentioned digital-to-analog conversion apparatus 83 which functions as a sine wave generator and the output drives the speaker 60 through audio amplifier and filter circuits 59. The register is needed since the waveform of each particular sine wave cannot be anticipated without knowing the period thereof. It is therefore necessary to measure and store the duration of the period for a time equal to at least the length of the longest period that can occur, and it is necessary to store as many measurements of the shortest periods as can occur in the longest period.

In the FIG. 10*a* receiver, the intermediate stages of the FIG. 4 receiver which convert the zero-crossing pulses of FIG. 10*b*–1 to the square wave signals of FIG. 10*b*–2 are omitted. Thus, in the operation of the FIG. 10*a* receiver, the zero-crossing pulses are supplied to pulse interval counter 81 which generates digital numbers representing the time interval (perhaps in microseconds) between adjacent pulses. These digital numbers (in bit form) are stored in core memory 82, and shifted to the next row in the core memory with each succeeding new time interval being counted. Each row of the core memory must have sufficient capacity in bits to define the longest time interval. Also, the core memory must have sufficient capacity in number of rows as there are the number of shortest time intervals in the longest time interval (i.e., the ratio of the highest to lowest repetition rate of zero-crossing pulses). The core memory is then read out by conventional means and supplied to the sine wave generator 83 which forms the half sine waves of alternating polarity having time durations proportional to the digital numbers read out as illustrated in FIG. 10*b*–3. It may be possible to modify the transmitter in a manner such that only one zero-crossing signal pulse is generated and provided for each audio-frequency signal rather than two pulses as with the system described, thereby resulting in a further savings in energy. In addition, it may also be desirable to have longer period sine waves be of larger amplitude, since it is generally true that the amplitude of an audio-frequency signal decreases with increasing frequency. This could be accomplished not merely by adding a filter to approximate the desired result but a waveform of the desired shape would be positively generated to obtain these more desirable characteristics. The manner in which this could be accomplished will be explained more fully hereinafter in connection with a different embodiment of the invention shown in FIGS. 11 through 13. It should be noted, however, that with the introduction of the sinusoidal wave shape to the received signal, a more faithful replica of the wave form of the original speech signal is obtained.

Figure 13:
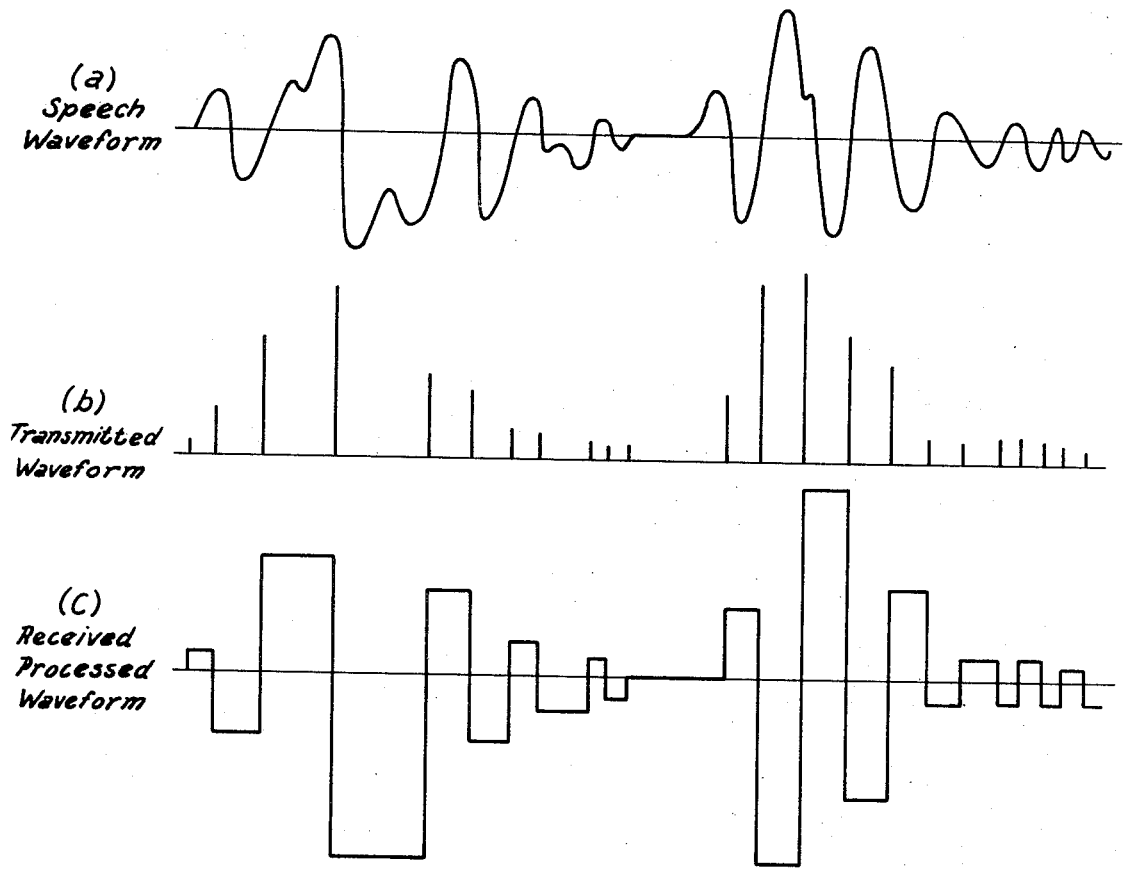
FIG. 13 is a series voltage versus time characteristic wave shapes illustrating the manner of operation of the limited energy speech transmission and receiving system shown in FIGS. 11 and 12.

FIGS. 11 through 13 of the drawings illustrate still another form of limited energy speech transmission system in accordance with the invention wherein envelope wave shaping of the transmitted zero-crossing pulses is accomplished. For this purpose, the transmitter of FIG. 11 includes a microphone and associated amplifying means 26 having its output supplied in parallel to an audio envelope detector 85 of conventional construction, and to a high pass filter 87. The audio envelope detector 85 has its output connected to one input of a combining circuit 86, the construction of which will be described more fully hereinafter in connection with FIG. 14 of the drawings. The high pass filter 87 serves to pre-emphasize the higher frequency components in the speech waveform signal supplied thereto from microphone 26. The pre-emphasized higher voice frequency signals are then supplied to the zero-crossing detector and wave shaping circuit 25 which is constructed and operates similarly to the zero-crossing detector circuit 25 shown in FIG. 3 of the drawings. The zero-crossing signal pulses appearing at the output of detector and wave-shaping circuit 25 are then applied to the input of the combiner 86 along with the audio envelope signal supplied from detector 85. The combining circuit 86 then functions to amplitude-modulate the zero-crossing signal pulses in a manner best depicted in FIG. 13 of the drawings. FIG. 13*a* illustrates the speech waveform of the audio frequency signal supplied by microphone 26. This speech signal is then converted by zero-crossing detector 25 to a series of fixed amplitude, zero-crossing signal pulses such as those illustrated in FIG. 1*b* of the drawings. Then in the combiner 86 the audio envelope shown in FIG. 13*a* is employed to amplitude-modulate the zero-crossing signal pulses so as to result in a waveform such as that shown in FIG. 13*b* of the drawing. These amplitude-modulated zero-crossing signal pulses appear at the output of the combiner circuit 86. The details of construction and operation of the combining circuit 86 will be described more fully hereinafter in connection with FIG. 14 of the drawings. The amplitude-modulated zero-crossing signal pulses are then supplied to the modulator 21 along with the radio frequency carrier supplied by oscillator 22, and the resulting pulse-modulated signal supplied through RF amplifier and filter 23 to the transmitting antenna 24.

The receiving system for use with the transmitter of FIG. 11 is illustrated in FIG. 12 and includes a receiving antenna 54 having its signal supplied to a first detector or mixer 55*a* in conjunction with the signal from a source of local oscillations 55*b*. The resulting intermediate frequency signal is supplied through an IF amplifier 55*c* in parallel to the input of an audio envelope detector 56*a*, and to the input of a zero-crossing pulse demodulator and wave-shaping circuit 56–57. The audio envelope detector 67 demodulates the audio envelope signal superimposed on the zero-crossing signal pulses by amplitude modulation, and supplies the demodulated audio envelope signal to a combining circuit 86. The zero-crossing pulse demodulator and wave-shaping circuit 56–57 similarly demodulates the zero-crossing signal pulses, and for this purpose would employ a high-pass filter for emphasizing the higher frequency zero-crossing signal pulses. The demodulated zero-crossing signal pulses are then supplied through a flip-flop clipped speech generator 58 which preferably comprises a bistable multivibrator. Flip-flop 58 then functions to develop an essentially constant amplitude, square waveshape, varying periodicity signal that is then supplied to the input of the combining circuit 86. As will be described more fully hereinafter in connection with FIG. 14 of the drawings, the combining circuit 86 operates to amplitude-modulate the constant amplitude, square waveshape, varying periodicity signal supplied thereto from the flip-flop generator 58 in the manner shown in FIG. 13*c* of the drawing. This amplitude-modulated, square waveshape, varying periodicity signal is then supplied to the audio amplifier and low-pass filter circuit 59 to the speaker 60 where it is reproduced in perceptible form. From a consideration of FIG. 13*c* of the drawings, however, it can be appreciated that here again, the waveshape of the signal applied to speaker 60 is a more faithful replica of the input audio frequency signal illustrated in FIG. 13a.

Figure 14:
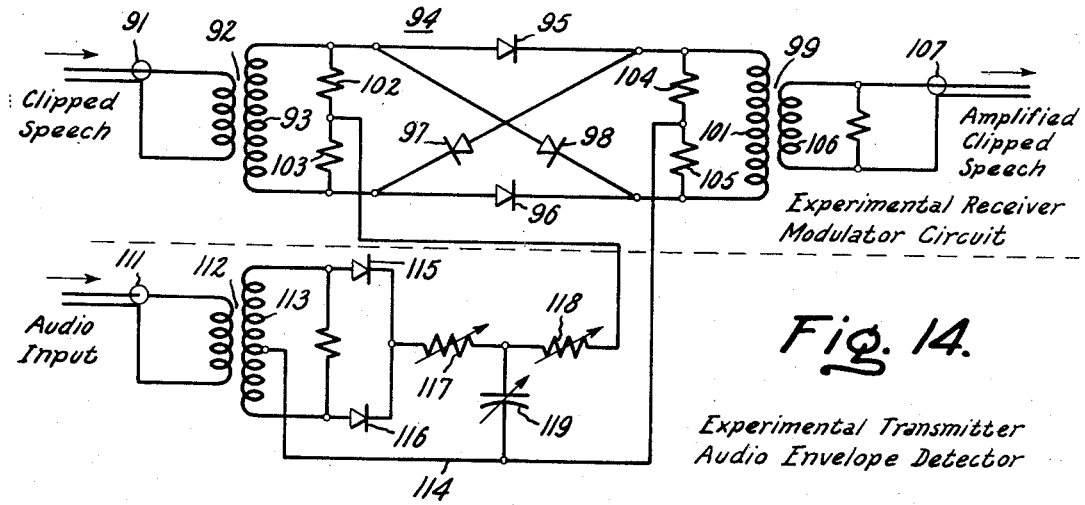
FIG. 14 is a detailed schematic circuit diagram of a combining circuit employed in the transmitting and receiving systems shown in FIGS. 11 and 12.

FIG. 14 of the drawings shows the circuit details of construction of the combining circuit means 86 employed in both the transmitter of FIG. 11 and the receiver of FIG. 12. In the combining circuit shown in FIG. 14, the audio frequency signal containing the zero-crossing signal pulses is supplied through an input terminal 91 to an input transformer 92 having its secondary winding 93 coupled to a ring demodulator 94. The ring demodulator 94 is further comprised by a plurality of diodes 95 through 98 coupled across an output transformer 99 whose primary winding 101 is coupled across the secondary winding 93 of input transformer 92 through the diodes 95 and 96. Opposite terminals of the input secondary winding 93 and the output primary winding 101 are interconnected through the diodes 97 and 98 in conventional ring demodulator fashion. The ring demodulator is completed by a pair of center-tapped resistors 102, 103 and 104, 105 coupled across the secondary winding 93 and the primary winding 101, respectively. The amplitude-modulated pulsed waveform signals resulting from the combining operation are derived from the secondary winding 106 of output transformer 99 where they are applied through output terminal 107 to a suitable speaker or other means for reproducing the original audio frequency signal in perceptible form.

The audio envelope signal derived by the audio envelope detector (demodulator) 67 of the receiver shown in FIG. 12 or the audio envelope detector 85 of the transmitter shown in FIG. 11, is supplied to the combining circuit through the input terminal 111 and applied across the primary winding of an input transformer 112. The input transformer 112 has its secondary winding 113 connected in a conventional balanced demodulator with its center tap point connected through a conductor 114 to the mid-tap point of the center-tapped resistors 104 and 105. The terminal points of the secondary winding 113 are connected through rectifying diodes 115 and 116 and through an adjustable filter circuit comprised by variable resistors 117, 118 and variable capacitor 119 to the center tap point of the center tap resistors 102 and 103.

In operation, the audio frequency envelope signal supplied to the center tap points of the center tap resistors 102, 103 and 104, 105, respectively, is in effect gated through the ring demodulator diodes 95 through 98 by the zero-crossing pulsed signal supplied to input transformer 92. As a consequence, the primary winding 101 of output transformer 99 will be supplied a signal which corresponds to the gated output of the speech envelope having the waveform shown in FIG. 13c of the drawings. The variable resistors 117, 118 and variable capacitor 119 are adjusted to provide optimum buildup and decay time of the detected audio-speech envelope so as to optimize this operation.

FIGS. 15 and 16 illustrate still another form of limited energy speech transmission in accordance with the teachings of the present invention. The systems shown in FIGS. 15 and 16, are, in fact, complete systems in that both the transmitter and the receiving equipment are disclosed in each of FIGS. 15 and 16 which are hybrid limited energy speech transmission systems. FIG. 15 illustrates one species of such a hybrid system, and FIG. 16 illustrates another species of the hybrid system. The reason for terming the systems shown in FIGS. 15 and 16 as hybrid limited energy speech transmission systems is that in each of these systems the lower portion of the speech spectrum is transmitted straight analog, and zero-crossing signal pulses are transmitted for the higher frequency portion of the audio frequency signal.

For the above-stated purpose, the hybrid LEST system shown in FIG. 15 includes a low-pass filter 121 having a band pass of about 200 to 500 cycles/sec., and a high-pass filter 122 having a band pass of about 500 to 3,500 cycles/sec., the two filters being connected in parallel to the output of the microphone and amplifying means 26. The low-frequency signal appearing at the output of the low pass filter 121 is then supplied to modulator 21 along with a radio frequency carrier from the oscillator 22, and the resultant modulated signal supplied through RF amplifier and filter 23 to transmitting antenna 24.

The higher frequency portion of the audio frequency signal appearing at the output terminals of the high pass filter 122 is supplied through a zero-crossing detector and wave shaping circuit such as 25 shown in FIG. 3 of the drawings and having an associated modulator 21', radio frequency carrier oscillator 22', radio frequency amplifier and filter 23', and transmitting antenna 24'. Since the construction and manner of operation of the zero-crossing detector and wave shaping circuit 25 was described in detail in connection with the circuit shown in FIG. 3, it is believed unnecessary to describe this circuit element in further detail. It should be noted, however, that this circuit element does operate to develop a series of constant amplitude fixed duration zero-crossing signal pulses whose temporal position represents the zero-crossing point or position of the original audio frequency input signal. This zero-crossing pulsed signal is then transmitted separately from the antenna 24'.

The low frequency portion of the spectrum is received by receiving antenna 54 and applied to the input of a conventional amplitude modulation receiver 55–56 which normally would include a radio frequency amplifier, first detector, local oscillator, IF amplifier and second detector so that at the output of the circuit element 55–56 a signal representative of the low frequency portion of the audio signal is produced. This low frequency portion of the signal is then supplied to a conventional adding circuit 87.

The transmitted zero-crossing signal pulses are similarly received by a receiving antenna 54' and supplied to the receiving portion 55'–56'. These again constitute the usual elements found in an amplitude modulation receiver such as a radio frequency amplifier, first detector, local oscillator IF amplifier and second detector. Consequently, at the output of the circuit element 55'–56' the zero-crossing signal pulses are produced similar to those shown in FIGS. 5–6. These zero-crossing signal pulses are then applied to a bistable multivibrator 58 which then operates to convert the zero-crossing signal pulses to an essentially square waveshape signal of fixed amplitude but varying periodicity such as shown in FIG. 1c of the drawings.

This square waveshape signal is then applied to the adding circuit 87 along with the low frequency portion of the audio frequency signal. The adding circuit 87 then serves to add the square waveshape, varying periodicity signal to the varying amplitude, low frequency signal.

FIG. 16 illustrates a different form af hybrid LEST system in accordance with the invention, wherein the low frequency portion of the spectrum, and the zero-crossing signal pulses are transmitted on a common carrier for bandwidth conservation purposes. In the hybrid LEST system shown in FIG. 16, the speech signal supplied from microphone and amplifying means 26 is again separated by low-pass filter 121 and high-pass filter 122. The low frequency portion of the spectrum appearing at the output of low pass filter 121 is then supplied to one input terminal of a conventional pulse width modulator circuit 123. The higher frequency portion of the audio signal appearing at the output of the high-pass filter 122 is first passed through a zero-crossing detector and shaping circuit 25 similar to that described with relation to FIG. 3 of the drawing which operates to produce zero-crossing signal pulses representative of the zero-crossing points or positions of the original speech waveform. These zero-crossing signal pulses are also supplied to a second input of the pulse width modulator 123. The pulse width modulator 123 is adjusted such that the leading edge of the zero-crossing pulses remain fixed and the width thereof is width-modulated by the low frequency signal portion supplied to the modulator 123 through low-pass filter 121. By this means then, the period between the leading edge of each of the resultant pulse width modulated pulse appearing at the output of modulator 123, will be preserved so as to preserve the zero-crossing information. In addition, however, the zero-crossing pulses will have been pulse-width-modulated to add thereto the information contained in the low frequency portion of the spectrum. Instead of pulse width modulation, the zero-crossing pulses could have been FM modulated, or pulse amplitude modulated, or modulated in some other manner to add the amplitude information contained in the low frequency portion of the signal without adding more energy or bandwidth than would be appropriate for the narrow bandwidth, low frequency portion of the signal itself. This pulse width modulated, zero-crossing pulsed signal is then supplied to a conventional AM transmitter comprised by the modulator 21, carrier frequency signal source 22, RF amplifier and filter 23, and transmitted by transmitting antenna 24.

The pulse width modulated, zero-crossing signal pulses are received by receiving antenna 54 and processed by a conventional AM receiver circuit 55 and 56 to produce at the output of the detector 56 an output signal which will contain both the amplitude information imposed on the received signal by pulse width modulation, and the zero-crossing information determined by the periodicity of the signal pulses. The amplitude envelope information is supplied directly to an adding circuit 87 which is of the conventional design as the adding circuit shown in FIG. 15 of the drawings. This signal is also supplied to the bistable multivibrator 58 where the leading edge of the zero-crossing signal pulses are effective to trigger the bistable multivibrator 58 off and on in a manner such that the square wave-shaped, varying periodicity signal similar to that shown in FIG. 1c is produced at its output. This output signal is then supplied to the adding circuit 87 along with the amplitude envelope information where they are added so as to result in an output signal similar to that obtained with the circuit shown in FIG. 15 of the drawings. This resultant output signal is then applied to the speaker 60 where it is reproduced in perceptible form.

Figures 17A, 17B:
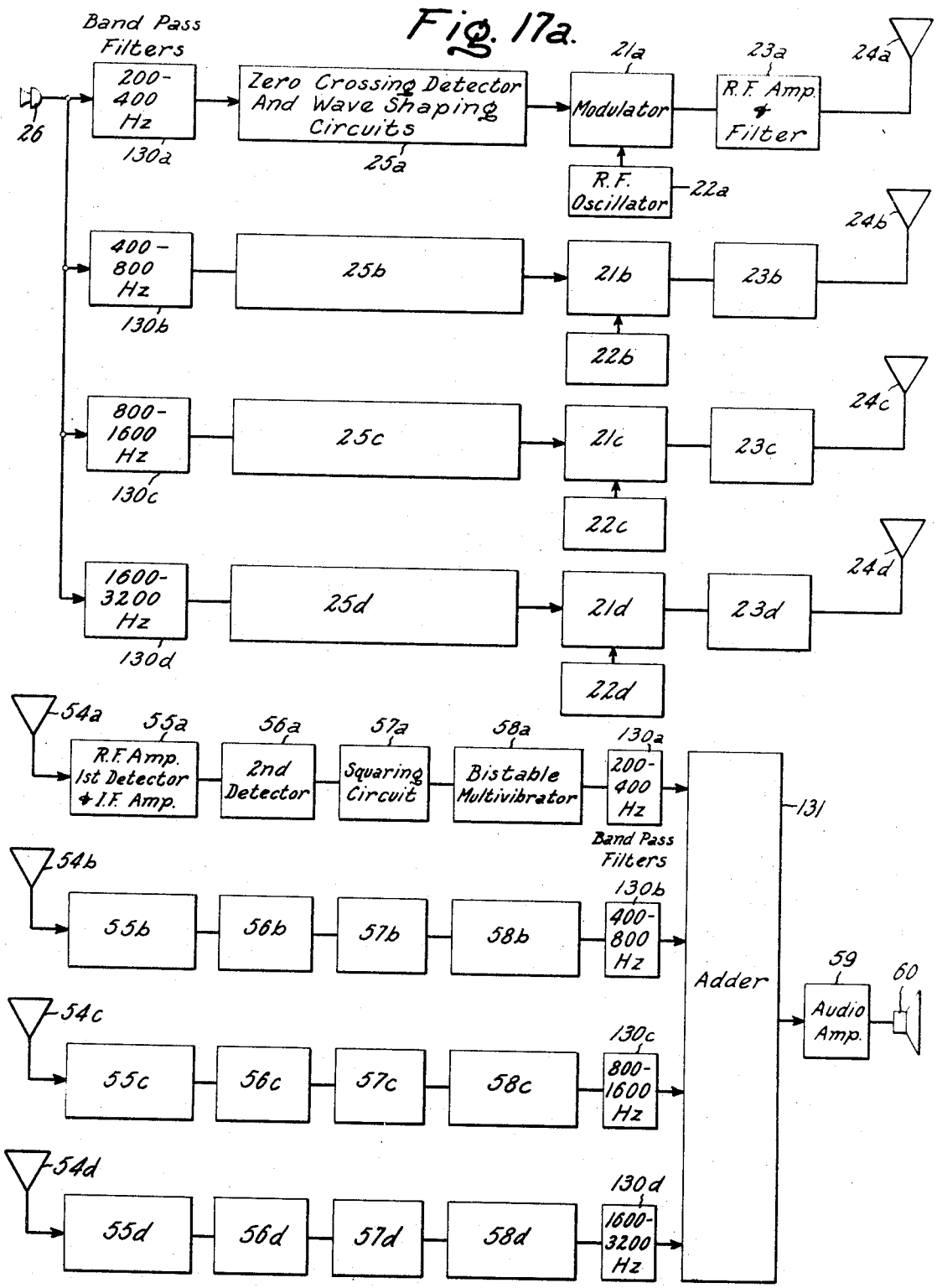
FIGS. 17a and 17b are functional block diagrams of a form of limited energy speech transmission and receiving system, respectively, in accordance with my invention wherein the audio signal is divided into frequency bands and corresponding zero-crossing pulses which are transmitted on separate carriers.

FIGS. 17a and 17b of the drawings illustrate a form of limited energy speech communication system constructed in accordance with my invention which is especially adapted for improving the quality of the speech transmitted and received by the LEST method. As stated hereinabove, it is believed that one of the reasons for the harsh quality of LEST is the presence of harmonics of low frequency components at the receiver output. In FIG. 17a there is shown a transmitter equipment for dividing the input voice signal into separate frequency bands and transmitting each band separately by the LEST method. Thus, a plurality of band pass filters, in this case four being illustrated, are connected in parallel to the output of the microphone and amplifying means 26. The four band-pass filters 130a, 130b, 130c and 130d are tuned to pass the frequency bands 200–400 cycles per second (now defined as Hertz or Hz.), 400–800 Hz., 800–1600 Hz. and 1600–3200 Hz., respectively. The input voice signal after being divided into these frequency bands is then supplied to separate zero-crossing detector and wave-shaping circuit 25a, 25b, 25c and 25d which are constructed and operate similarly to the zero-crossing detector and wave-shaping circuit 25 in FIG. 3 to obtain the zero-crossing signal pulses at the outputs thereof. The zero-crossing signal pulses are then supplied to the modulators 21a, 21b, 21c and 21d along with the radio frequency carriers supplied by the RF oscillators 22a, 22b, 22c and 22d each tuned to a different RF frequency and the resulting pulse-modulated RF signals are supplied through respective RF amplifier and filter circuits 23a, 23b, 23c and 23d to multiple communication channels which are indicated as transmitting antennae 24a, 24b, 24c and 24d but may obviously also be any other type of communication channel whether wireless or wired such as telephone lines and cables.

The plurality (four being illustrated for exemplary purposes only) of pulse-modulated radio frequency signals, each having a different RF carrier frequency and audio band pulse-modulated thereon, are received at the receiving system illustrated in FIG. 17b which includes a corresponding number of receiving communication channels illustratively indicated as receiving antennae 54a, 54b, 54c and 54d. The four pulse modulated carrier signals then pass into the RF amplifier, first detector and IF amplifier stages 55a, 55b, 55c and 55d. The local oscillators in each of the first detectors are tuned to a different RF frequency to separate the four signal channels. The pulse-modulated intermediate frequency signals then pass into the second detector stages 56a, 56b, 56c and 56d to develop at the outputs thereof four series of zero-crossing signal pulses representative of the zero-crossing points of the corresponding four frequency bands of the original audio-frequency input signals at microphone 26. The zero-crossing signal pulses may be supplied through squaring circuits 57a, 57b, 57c and 57d for squaring the leading and trailing edges of the signal pulses supplied thereto although such refinement is not essential. These squared, zero-crossing signal pulses are then applied to the bistable multivibrator circuits 58a, 58b, 58c and 58d for reconverting the zero-crossing pulses to essentially square wave shaped signals of constant amplitude but varying periodicity. The components of the LEST receiver through the bistable multivibrator correspond to the same components of the receiver illustrated in FIG. 4 just as the components of the transmitter following the band pass filters in FIG. 17a correspond to like components of the transmitter in FIG. 3. The four frequency-band square wave shaped signals of constant amplitude at the outputs of the bistable multivibrators in FIG. 17b are then supplied to the band-pass filters 130a, 130b, 130c and 130d which, as in the case of the transmitter band-pass filters are correspondingly designed to pass the frequency bands 200–400 Hz., 400–800 Hz., 800–1600 Hz. and 1600–3200 Hz., respectively. The receiver band pass filters remove harmonics from the square wave shaped signals and thus at the output of the band-pass filters in FIG. 17b are obtained four frequency-band sinusoidally shaped signals of constant amplitude but varying periodicity. These sinusoidal wave shaped signals are then supplied to a conventional adder circuit 131 for adding the four frequency-band signals and then applied to an audio amplifier 59 and audio speaker 60 or other suitable means for reproducing the original audio-frequency speech signal with a substantially less harsh quality than that obtained with the hereinbefore described unmodified LEST circuits. This reduced harshness is obtained primarily by the fact that the receiver band-pass filters are adapted to change the square wave shaped signals at the outputs of the bistable multivibrators into essentially sinusoidally wave shaped signals separate frequency bands having fewer harmonics especially of low frequency components and thus a greater fidelity of the input voice frequency components is obtained.

Figure 18A:
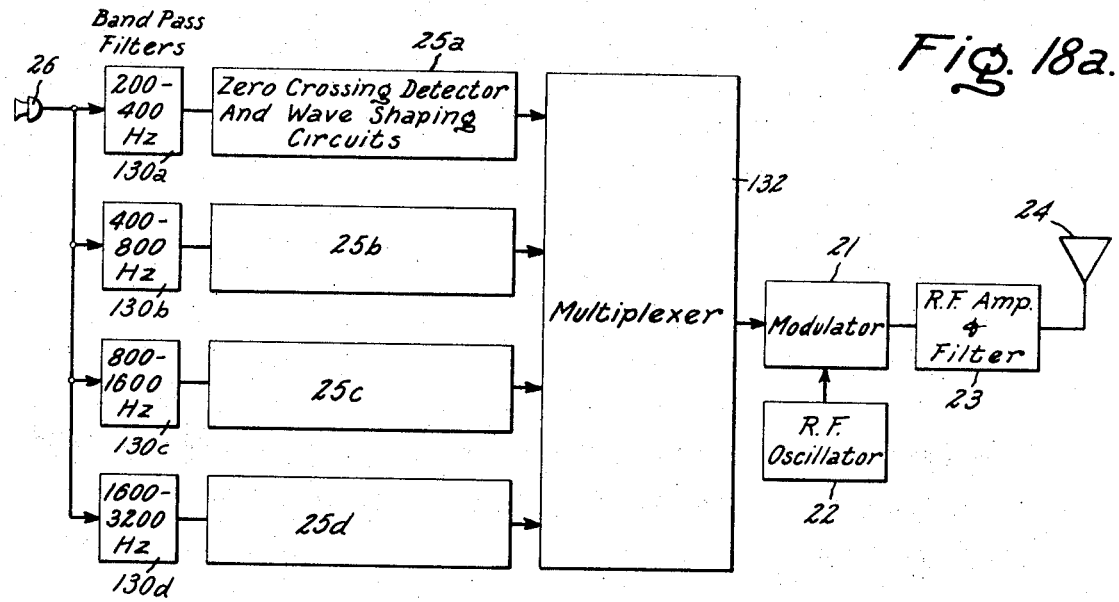
FIGS. 18a and 18b are functional block diagrams of the modified form of limited energy speech transmission and receiving system shown in FIGS. 17a and 17b, respectively, wherein the zero-crossing pulses are transmitted on a common carrier.
Figure 18B:
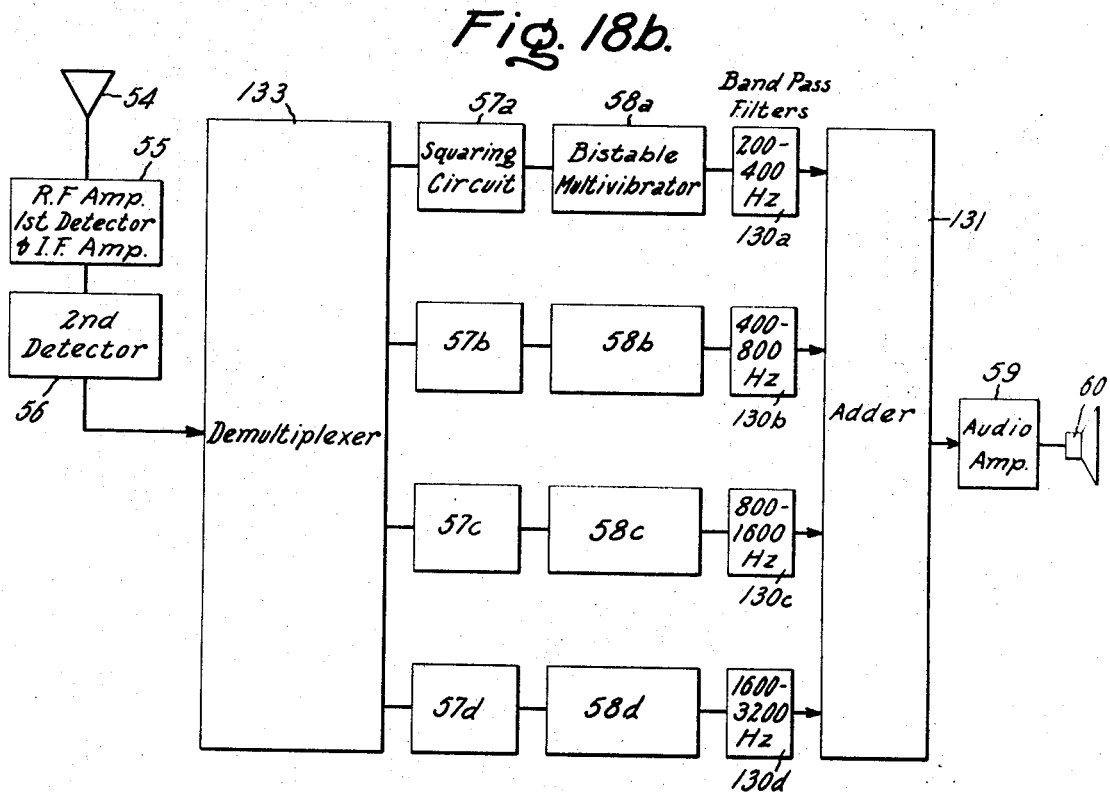

FIGS. 18a and 18b illustrate a second LEST system especially adapted for improving the quality of speech communication by reducing the harshness due to the presence of harmonics of low frequency components within the audio pass band at the receiver output. The system illustrated in FIGS. 18a and 18b is similar to the system in FIGS. 17a and 17b in that the input voice signal is separated into individual frequency bands and each band is then operated on by the zero-crossing detector and wave-shaping circuits 25a, 25b, 25c and 25d. The distinction is in that the outputs of the wave-shaping circuits are multiplexed together and modulated on a single radio frequency carrier supplied from RF oscillator 22 for transmission after passing through radio frequency amplifier and filter circuit 23. Correspondingly, the multiplexed LEST signals are received by antenna 54 in FIG. 18b and are first demodulated by the RF amplifier, first detector and IF amplifier 55 and second detector 56 so that at the output of circuit 56 are produced the multiplexed zero-crossing signal pulses. These multiplexed zero-crossing signal pulses are then supplied to a conventional demultiplexer 133 which produces at its outputs the zero-crossing signal pulses occurring at the outputs of the zero-crossing detectors in the transmitter. The demultiplexed zero-crossing signals are then supplied through the squaring circuits 57a, 57b, 57c, 57d and the bistable multivibrator circuits 58a, 58b, 58c and 58d which may comprise triggered flip-flop circuits for reconverting the zero-crossing pulses to essentially square wave shaped signals of constant amplitude but varying periodicity such as illustrated in FIG. 1c of the drawings. The square wave shaped signals at the output of the bistable multivibrators are then supplied to the band-pass filters 130a, 130b, 130c and 130d to provide at the outputs thereof the essentially sinusoidally wave shaped signals of constant amplitude but varying periodicity. The outputs of the band-pass filters are added in conventional adder circuit 131 and then applied to audio-amplifier 59 and suitable audio speaker 60 or other means for reproducing the original audio-frequency speech signals with a substantially less harsh quality as in the case of the system of FIG. 17b.

FIGS. 17a, 17b and FIGS. 18a, 18b (as well as FIGS. 7, 8, 10, 11, 12, 15, 16) illustrate modified LEST systems for reproducing audio-frequency speech signals having reduced harshness. In the FIGS. 17a, 17b system the audio signal is divided into various frequency bands and corresponding zero-crossing pulses are transmitted on separate carriers whereas in the FIGS. 18a, 18b system the zero-crossing pulses are transmitted on a common carrier. A third system for obtaining reduced harshness in the reproduced audio-speech signal is illustrated in FIG. 19 which comprises an LEST receiver, the transmitter being the same as the one illustrated in FIG. 3, for example. The radio frequency signal is received by antenna 54 and is applied through the RF amplifier, first detector and IF amplifier 55 and second detector 56 to produce at the output thereof a series of zero-crossing signal pulses representative of the zero-crossing points of the original audio-frequency input signal as in FIG. 4. A plurality of parallel connected pulse rate limit filter circuits are connected to the output of the second detector 56, each filter circuit being tuned to a band of frequency representing twice the band of frequencies to which subsequent band-pass filters are tuned. Thus, for a set of four band-pass filters 130a, 130b, 130c and 130d, tuned to the frequency bands of 200–400 Hz., 400–800 Hz., 800–1600 Hz. and 1600–3200 Hz., respectively there is a set of four pulse rate limit filters 134a, 134b, 134c and 134d tuned to frequency bands of 400–800 Hz., 800–1600 Hz., 1600–3200 Hz. and 3200–6400 Hz., respectively. Thus, at the output of the second detector 56 each pulse rate limit filter circuit passes only pulses occurring between the rate limits set by each respective filter and such pulses are applied to respective bistable multivibrators 58a, 58b, 58c and 58d for converting the zero-crossing signal pulses to essentially square wave shape signals of fixed amplitude but varying periodicity and and then to the band-pass filter 130a, 130b, 130c and 130d for removing harmonics from the input square wave shaped signals. The bistable multivibrators, band-pass filters, adder 131, audio amplifier 59 and speaker 60 are the same as those illustrated in FIGS. 17b and 18b. Thus, the original audio-frequency speech signal is transmitted by the simplified transmitter of FIG. 3 and is reproduced by reproducing means 60 with a substantially less harsh quality than that obtained with the unmodified system illustrated in FIGS. 3 and 4. It may be noted that the squaring circuit 57 is not illustrated in FIG. 19 since such circuit is not an essential element but merely a refinement. Also, it should be evident that the signals in the FIGS. 17a, 17b, 18a, 18b and 19 systems may be processed by any number of frequency bands, the illustrated four bands being merely exemplary and by no means a limitation. These frequency bands are indicated as being octave bands but obviously may have smaller or greater frequency spreads, as desired.

From the foregoing description, it can be appreciated that the new and improved limited energy speech transmission and receiving system made available by my invention allows a speech signal to be first digitized and then transmitted by pulse techniques to achieve a substantial reduction in the energy required to be transmitted. Digitizing of the input speech signal is achieved by developing time sequential signal pulses representative of the zero-crossing positions of the input speech signal. These zero-crossing signal pulses are then modulated on a suitable radio frequency carrier for transmission to the receiving apparatus. By this arrangement, transmission occurs only when there is a bit of information to be conveyed. This technique allows intelligible speech to be transmitted with considerable less energy (about one-tenth) the energy required by conventional energy saving techniques such as single side band suppressed carrier transmission. Accordingly, it can be appreciated that the invention does provide new and improved limited energy speech transmission and receiving systems which allow for a substantial reduction in the energy required to transmit a given amount of information. Further, because of its nature the system allows simplicity of design in the equipment of both the transmitter and receiver in a manner such that for many of the components of this system, integrated circuit manufacturing techniques can be used in the fabrication of the equipment. Further, by reason of its characteristics, the limited energy speech transmission and receiving system made possible by the invention results in greater fidelity of reproduction, less noise, etc., than can be achieved with other known types of digital communication, and is compatible with the known digital communication systems such as pulse position modulation, or pulse ranging systems for position fixing such as are used in the navigation satellite program. Additionally, by reason of its characteristic whereby the zero-crossing pulses can be made phase coherent with pulses from a stable reference clock, the new and improved LEST system can be readily adapted to various coding methods for anti-jam and secure communication purposes, or to accommodate several channels of information by time multiplexing.

Having described several embodiments of a new and improved limited energy speech transmission and receiving system constructed in accordance with the invention, it is believed obvious that other modifications and variations of this invention are possible in the light of the above teachings.

Another means to reduce harshness in the reproduced speech is possible. Some amplitude variation is introduced at the receiver by the use of a gain control operated by a pulse counter. Following a pause in speech, full amplitude of the audio output is not achieved until a number, say 10 to 100, pulses have been counted. This tends to reduce audio noise, such as speaker breath intake, between words, and to soften the initial portion of spoken words. It is therefore to be understood that many changes may be made in the particular embodiments of the invention described which are within the full intended scope of the invention as defined by the appended claims.

What I claim as new and desire to secure by Letters Patent of the United States is:

1. A limited energy speech communication system for transmitting speech with approximately 1/10 the energy required by conventional energy saving techniques such as single side band suppressed carrier, employing transmitter means and receiver means and wherein the transmitter means includes modulator means supplied by a source of radio frequency carrier signals and having its output coupled through the appropriate filter and radio frequency amplifier means to transmitting antenna means and wherein the receiver means includes antenna means and demodulation means for reproducing the input intelligence signal supplied to the modulator means of the transmitter, the improvement in the transmitter means comprising
microphone and amplifying means for reproducing speech waves in electrical form,
a balanced limiter having its output supplied to clipping amplifier which in turn has its output supplied to a squaring circuit, the input to the balanced limiter being coupled to the output of the microphone and amplifying means,
zero-crossing detector means operatively coupled to the output of the squaring circuit for converting the speech signal to a time sequential series of pulsed electric signals representative of the zero-crossing points of the original speech waveform, each pulse having a maximum duration such that the maximum duty cycle is 50%, and
means for coupling the output of said zero-crossing detector means to the input of the modulator means and comprising a repetition rate limiter supplying a pulse shaping circuit that in turn supplies its output in the form of a constant amplitude, constant time duration, varying periodicity pulsed wave shape signal representative of the zero-crossing points of the original speech waveform to the modulator means, the improvement in the receiver means comprising
squaring circuit means operatively coupled to the output of the demodulation means,
bistable multivibrator means having its input operatively coupled to the output of the squaring circuit means for reconverting the zero-crossing pulses to a square wave shape signal of constant amplitude and varying periodicity, and
wave-shaping means having its input connected to an output of said bistable multivibrator means and its output supplied to a means for reproducing the original speech signal in a perceptible form through a suitable audio amplifier means.

2. The limited energy speech communication system set forth in claim 1 wherein
the receiver wave-shaping means is further characterized by sine wave shaping circuit means interposed between the output of the bistable multivibrator means and the input to the means for reproducing the original speech signal in perceptible form for converting the square wave signal to a sinusoidal wave shape signal of constant amplitude and varying periodicity and thereby obtaining a more faithful reproduction of the original speech signal.

3. A limited energy speech communication system for transmitting speech with approximately 1/10 the energy required by conventional energy saving techniques such as single side band suppressed carrier, employing transmitter means and receiver means and wherein the transmitter means includes modulator means supplied by a source of radio frequency carrier signals and having its output coupled through appropriate filter and radio frequency amplifier means to transmitting antenna means and wherein the receiver means includes antenna means and demodulation means for reproducing the input intelligence signal supplied to the modulator means of the transmitter, the improvement in the transmitter means comprising
a plurality of microphone and amplifying means for reproducing speech waves in electrical form and for providing a plurality of information channels,
a like plurality of wave-shaping circuit means and zero-crossing detector means operatively coupled to the output of said microphone and amplifying means in the respective information channels for converting the speech signal to time sequential series of pulsed electric signals representative of the zero-crossing points of the original speech waveform, each pulse having a maximum duration such that the maximum duty cycle is 50%,
a like plurality of AND circuit means having one input coupled to the output of a respective zero-crossing detector and wave-shaping circuit means,
clock signal generating means having its output supplied to the remaining input terminals of the AND circuit means, the clock signal input to a given AND circuit means being shifted in phase with respect to the clock signal input supplied to the remaining AND circuit means, and
OR circuit means having its input terminal supplied from the output terminals of said AND circuit means and having multiplexed zero-crossing pulse signals at its output supplied to the modulator means, the improvement in the receiver means comprising
demultiplexing means for demodulating the received radio frequency multiplexed signal and comprising
a plurality of receiver AND circuit means each having one input terminal supplied from the output of said demodulation means,
a receiver clock signal generating means, and
synchronizing circuit means supplied from the output of said demodulation means and coupled to said receiver clock signal generating means for synchronizing the operation of the receiver clock signal generating means with the clock signal generating means of the transmitter, the output of said receiver clock signal generating means being supplied to each of said receiver AND circuit means, the receiver clock signal input to a given receiver AND circuit means being shifted in phase with respect to the clock signal input supplied to the remaining receiver AND circuit means,
receiver wave-shaping means coupled to the output of each of said receiver AND circuit means, and
means for reproducing the original speech signal in perceptible form operatively coupled to the output of each of said receiver wave-shaping means.

4. A limited energy speech communication system for transmitting speech with approximately 1/10 the energy required by conventional energy saving techniques such as single side band suppressed carirer, employing transmitter means and receiver means and wherein the transmitter means includes modulator means supplied by a source of radio frequency carrier signals and having its output coupled through appropriate filter and radio frequency amplifier means to transmitting antenna means and wherein the receiver means includes antenna means and demodulation means for reproducing the input intelligence signal supplied to the modulator means of the transmitter, the improvement in the transmitter means comprising
microphone and amplifying means for reproducing speech waves in electrical form,
zero-crossing detector means operatively coupled to the output of said microphone and amplifying means for converting the speech signal to a time sequential series of pulsed electric signals representative of the zero-crossing points of the original speech waveform, each pulse having a maximum duration such that the maximum duty cycle is 50%, audio envelope detecting means operatively coupled to the output of the microphone and amplifying means and in parallel with the zero-crossing detector means, and combining circuit means having input terminals operatively coupled to the output of the zero-crossing detector means and to the output of the audio envelope detecting means and having its output coupled to the input of the modulator means for envelope shaping of the pulsed waveform signal emitted by the transmitter, the improvement in the receiver means comprising said demodulation means including a first detector, local oscillator and intermediate frequency amplifier, zero-crossing pulse demodulation means and audio envelope demodulation means having an input thereof coupled in parallel to the output of the intermediate frequency amplifier, bistable multivibrator wave shaping means having its input coupled to the output of the zero-crossing pulse demodulation means, and combining circuit means haivng a first input terminal coupled to the output of said bistable multivibrator means and having a second input terminal coupled to the output of said audio envelope demodulation means, the output of said combining circuit means being supplied to a means for reproducing the original speech signal in perceptible form through suitable audio filter and amplifying means.

5. A limited energy speech communication system for transmitting speech with approximately 1/10 the energy required by conventional energy saving techniques such as single side band suppressed carrier, employing transmitter means and receiver means and wherein the transmitter means includes modulator means supplied by a source of radio frequency carrier signals and having its output coupled through appropriate filter and radio frequency amplifier means to transmitting antenna means and wherein the receiver means includes antenna means and demodulation means for reproducing the input intelligence signal supplied to the modulator means of the transmitter, the improvement in the transmitter means comprising
microphone and amplifying means for reproducing speech waves in electrical form,
high pass filter means connected to the output of the microphone and amplifying means,
zero-crossing detector means connected to the output of said high pass filter means for converting the speech signal to a time sequential series of pulsed electric signals representative of the zero-crossing points of the original speech waveform, each pulse having a maximum duration such that the maximum duty cycle is 50%,
low pass filter circuit means operatively coupled in parallel with the high pass filter circuit means and zero-crossing detector means and having an input connected to the output of the microphone and amplifying means, and
means for coupling the output of said zero-crossing detector means and low pass filter circuit means to the input of the modulator means, the improvement in the receiver means comprising
wave-shaping means connected to the output of the receiver demodulation means,
adding circuit means having a first input terminal operatively coupled to the output of the demodulation means and having a second input terminal operatively coupled to the output of said wave-shaping means, and
means for reproducing the original speech signal in perceptible form being operatively coupled to the output terminal of said adding circuit means.

6. In a limited energy speech transmitter for transmitting speech with approximately 1/10 the energy required by conventional energy saving techniques such as single side band suppressed carrier, including modulator means supplied by a source of radio frequency carrier signals and having its output coupled through appropriate filter and radio frequency amplifier means to transmitting antenna means, the improvement comprising microphone and amplifying means for reproducing speech in electrical form, a balanced limiter having its output supplied to a clipping amplifier which in turn has its output supplied to a squaring circuit, the input to the balanced limiter being coupled to the output of the microphone and amplifying means, zero-crossing detector means connected to the output of the squaring circuit for converting the speech signal to a series of pulsed electrical signals representative of the zero-crossing points of the original speech waveform, each pulse having a maximum duration such that the maximum duty cycle is 50%, and wave-shaping means comprising a repetition rate limiter coupled to the output of the zero-crossing detector and supplying a pulse-shaping circuit that in turn supplies its output in the form of a constant amplitude, constant time duration, varying periodicity wave shape signal representative of the zero-crossing points of the original speech waveform to the modulator means.

7. In a limited energy speech transmitter for transmitting speech with approximately 1/10 the energy required by conventional energy saving techniques such as single side band suppressed carrier, including modulator means supplied by a source of radio frequency carrier signals and having its output coupled through appropriate filter and radio frequency amplifier means to transmitting antenna means, the improvement comprising a plurality of microphone and amplifying means for reproducing speech in electrical form and providing a plurality of information channels, a like plurality of zero-crossing detector means for converting the speech signal to series of pulsed electric signals representative of the zero-crossing points of the original speech waveform, each pulse being of maximum duration such that the maximum duty cycle is 50%, there being a respective zero-crossing detector means for each information channel, AND circuit means having one input coupled to the output of a respective zero-crossing detector means, clock signal generating means having its output supplied to the remaining input terminal of the AND circuit means, the clock signal input to a given AND circuit means being shifted in phase with respect to the clock signal input supplied to the remaining AND circuit means, and OR circuit means having its input terminals supplied from the output terminals of said AND circuit means and having its output supplied to the modulator means.

8. In a limited energy speech transmitter for transmitting speech with approximately 1/10 the energy required by conventional energy saving techniques such as single side band suppressed carrier, including modulator means supplied by a source of radio frequency carrier signals and having its output coupled through appropriate filter and radio frequency amplifier means to transmitting antenna means, the improvement comprising microphone and amplifying means for reproducing speech in electrical form, a high pass filter connected directly to the output of said microphone and amplifying means for pre-emphasizing the higher frequency components in the original speech waveform, zero-crossing detector means directly connected to the output of said high pass filter for converting the speech signal to a series of pulsed electrical signals representative of the zero crossing points of the original speech waveform, each pulse having a maximum duration such that the maximum duty cycle is 50%, audio envelope detecting means operatively coupled to the output of the microphone and amplifying means and in parallel with the zero-crossing detector means, and combining circuit means having input terminals operatively coupled to the output of the zero crossing detector means and to the output of the audio envelope detecting means and having its output coupled to the input of the modulator means for envelope shaping of the pulsed waveform signal emitted by the transmitter.

9. In a limited energy speech transmitter for transmitting speech with approximately $\frac{1}{10}$ the energy required by conventional energy saving techniques such as single side band suppressed carrier, including modulator means supplied by a source of radio frequency carrier signals and having its output coupled through appropriate filter and radio frequency amplifier means to transmitting antenna means, the improvement comprising microphone and amplifying means for reproducing speech in electrical form, high pass filter circuit means connected to the output of the microphone amplifying means, zero-crossing detector means connected to the output of said high pass filter circuit means for converting the speech signal to a series of pulsed electric signals representative of the zero-crossing points of the original speech waveform, each pulse having a maximum duration such that the maximum duty cycle is 50%, low pass filter circuit means operatively coupled in parallel with the high pass filter circuit means and zero-crossing detector means and having an input connected to the output of the microphone and amplifying means and for transmitting the lower portion of the speech spectrum straight analog, and means for coupling the output of said zero crossing detector means and low pass filter circuit means to the input of the modulator means.

10. In a limited energy speech transmitter for transmitting speech with approximately $\frac{1}{10}$ the energy required by conventional energy saving techniques such as single side band suppressed carrier, including modulator means supplied by a source of radio frequency carrier signals and having its output coupled through appropriate filter and radio frequency amplifier means to transmitting antenna means, the improvement comprising microphone and amplifying means for reproducing speech in electrical form, a high pass filter circuit means connected to the output of the microphone amplifying means, zero-crossing detector means connected to the output of said high pass filter circuit means for converting the speech signal to a series of pulsed electric signals representative of the zero crossing points of the original speech waveform, each pulse having a duration such that the maximum duty cycle is 50%.

means for coupling the output of said zero crossing detector means to the output of the modulator means, an auxiliary low frequency signal channel operatively coupled in parallel with the high pass filter circuit means and zero crossing detector means and comprising low pass filter circuit means having its input coupled to the output of the microphone and amplifying means and having its output coupled to the input of a second modulation means, a second source of radio frequency carrier signals coupled to the remaining input to said second modulation means, and the output of said second modulation means being coupled through second radio frequency amplifying and filter means to a second transmitting antenna.

11. In a limited energy speech transmitter for transmitting speech with approximately $\frac{1}{10}$ the energy required by conventional energy saving techniques such as single side band suppressed carrier, including modulator means supplied by a source of radio frequency carrier signals and having its output coupled through appropriate filter and radio frequency amplifier means to transmitting antenna means, the improvement comprising microphone and amplifying means for reproducing speech in electrical form, a high pass filter circuit means connected to the output of the microphone and amplifying means, zero-crossing detector means connected to the output of said high pass filter circuit means for converting the speech signal to a series of pulsed electric signals representative of the zero crossing points of the original speech waveform, each pulse having a maximum duration such that the maximum duty cycle is 50%, pulse width modulation means having one input coupled to the output of said zero-crossing detector means and having its output coupled to the input of said modulator means, and low pass filter circuit means operatively coupled in parallel with the high pass filter circuit means and zero-crossing detector means and having an input connected to the output of the microphone and amplifying means, the output of said low pass filter circuit means being supplied to the remaining input terminal of said pulse width modulation means.

12. In a limited energy speech transmission receiver for receiving signals from a transmitter transmitting speech with approximately $\frac{1}{10}$ the energy required by conventional energy saving techniques such as single side band suppressed carrier, including demodulation means supplied from radio frequency signal receiving antenna means and suitable amplifying means, the improvement comprising the demodulation means includes a first and second detector, wave-shaping means connected to the output of said second detector and comprising squaring circuit means, bistable multivibrator means having its input operatively coupled to the output of the squaring circuit means for developing a square wave shape signal of constant amplitude and varying periodicity, and means connected to an output of said bistable multivibrator means for reproducing the original speech signal in perceptible form through suitable audio amplifier means.

13. The receiver set forth in claim 12 further characterized by sine wave shaping circuit means interposed between the output of the bistable multivibrator means and the input to the means for reproducing the original speech signal in perceptible form for converting the square wave shape signal to a sinusoidal wave shape.

14. In a limited energy speech transmission receiver for receiving signals from a transmitter transmitting speech with approximately $\frac{1}{10}$ the energy required by conventional energy saving techniques such as single side band suppressed carrier, including demodulation means supplied from radio frequency signal receiving antenna means and suitable amplifying means, the improvement comprising the demodulation means includes a first detector, local oscillator and intermediate frequency amplifier, zero-crossing pulse demodulation means and audio envelope demodulation means having the inputs thereof coupled in parallel to the output of the intermediate frequency amplifier, bistable multivibrator means having its input coupled to the output of the zero-crossing pulse demodulation means, combining circuit means having a first input terminal coupled to the output of said bistable multivibrator means and having a second input terminal coupled to the output of said audio envelope demodulation means, and means connected to the output of said combining circuit means for reproducing the original speech signal in perceptible waveform through suitable audio filter and amplifying means.

15. In a limited energy speech transmission receiver for receiving signals from a transmitter transmitting speech with approximately $1/10$ the energy required by conventional energy saving techniques such as single side band suppressed carrier, including demodulation means supplied from radio frequency signal receiving antenna means and suitable amplifying means, the improvement comprising wave-shaping means operatively coupled to the output of said demodulation means, adding circuit means having a first input terminal operatively coupled to the output of said demodulation means and having a second input terminal operatively coupled to the output of said wave-shaping means, and means operatively coupled to the output terminal of said adding circuit means for reproducing the original speed signal in perceptible form.

16. The receiver set forth in claim 15 wherein first and second of said demodulation means including amplifying means are supplied from separate radio frequency signal receiving antenna means, the first input terminal of the adding circuit means is operatively coupled to the output of the first demodulation means, and the second input terminal is operatively coupled to the output of the wave-shaping means that in turn is operatively coupled to the output of the second demodulation means.

17. In a limited energy speech transmitter for transmitting speech with approximately $1/10$ the energy required by conventional energy saving techniques such as single side band suppressed carrier, including modulator means supplied by a source of radio frequency carrier signals and having its output coupled through appropriate filter and radio frequency amplifier means to transmitting antenna means, the improvement comprising microphone and amplifying means for reproducing speech in electrical form, a plurality of band-pass filter circuits each tuned to a different frequency range and connected in parallel to the output of said microphone and amplifying means, a like plurality of zero-crossing detector circuits connected to the outputs of the respective band pass filter circuits for converting the speech signal to series of pulsed electric signals representative of the zero-crossing points of the original speech waveform, each pulse having a maximum duration such that the maximum duty cycle is 50%, means operatively coupled to the output of said zero-crossing detector circuits for multiplexing the signals at the outputs thereof, and said modulator means connected to the output of said multiplexing means and comprising a single source of radio frequency carrier signals having its output coupled through a filter and radio frequency amplifier means to a single transmitting communication channel means.

18. In a limited energy speech transmission receiver for receiving signals from a transmitter transmitting speech with approximately $1/10$ energy required by conventional energy saving techniques such as single side band suppressed carrier, including demodulation means supplied from radio frequency signal receiving antenna means and suitable amplifying means, the improvement comprising wave-shaping means comprising a plurality of bistable multivibrator circuits operatively coupled in parallel to the output of the demodulation means, a like plurality of band pass filter circuits each tuned to a different frequency range and connected to the outputs of the respective bistable multivibrator circuits, means connected to the outputs of the band pass filters for adding the signals at the outputs of the band pass filters which provide essentially sinusoidally wave shaped signals to obtain a more faithful reproduction of the original speech signal, and means connected to the output of said adding means for reproducing the original speech signal in perceptible form.

19. The limited energy speech transmission receiver set forth in claim 18 wherein said demodulation means comprise a like plurality of second detector circuits respectively supplied from a like plurality of said radio frequency signal receiving antenna means and suitable amplifying means.

20. In the limited energy speech transmission receiver set forth in claim 18 and further comprising said demodulation means comprises a single second detector circuit supplied from said radio frequency signal receiving antenna means and suitable amplifying means which respectively receive and amplify multiplexed signals, and means connected to the output of said second detector circuit and operatively coupled to the input of said bistable multivibrator circuits for separating the multiplexed signal to a like plurality of the demodulated signals.

21. In the limited energy speech transmission receiver set forth in claim 18 and further comprising said demodulation means comprises a single second detector circuit supplied from said radio frequency signal receiving antenna means and suitable amplifying means, and a like plurality of pulse rate limit filter circuits connected in parallel to the output of said second detector circuit, the like plurality of bistable multivibrator circuits operatively coupled to the outputs of the respective pulse rate limit filter circuits.

References Cited

UNITED STATES PATENTS

| 3,125,723 | 3/1964 | Spogen et al. | 325—38 |
| 3,335,225 | 8/1967 | Campanella et al. | 179—1 |
| 3,381,093 | 4/1968 | Flanagan | 179—15.55 |

OTHER REFERENCES

Licklider and Pollack: "Effects of Differentiation, Integration and Infinite Peak Clipping Upon the Intelligibility of Speech," vol. 20, Jour. Acous. Soc. of Amer., January 1948, pp. 42–51.

RICHARD MURRAY, Primary Examiner

K. W. WEINSTEIN, Assistant Examiner